(12) United States Patent
Slocum et al.

(10) Patent No.: US 8,698,338 B2
(45) Date of Patent: Apr. 15, 2014

(54) OFFSHORE ENERGY HARVESTING, STORAGE, AND POWER GENERATION SYSTEM

(75) Inventors: Alexander H. Slocum, Bow, NH (US); Gregory E. Fennell, Bedford, MA (US); Alison S. Greenlee, Seabrook, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 658 days.

(21) Appl. No.: 13/039,364

(22) Filed: Mar. 3, 2011

(65) Prior Publication Data

US 2011/0215650 A1    Sep. 8, 2011

Related U.S. Application Data

(60) Provisional application No. 61/311,478, filed on Mar. 8, 2010.

(51) Int. Cl.
*F03B 13/00* (2006.01)

(52) U.S. Cl.
USPC ............................................. 290/54; 290/53

(58) Field of Classification Search
USPC ............................ 290/42, 43, 44, 53, 54, 55
See application file for complete search history.

(56) References Cited

U.S. PATENT DOCUMENTS

| | | | | |
|---|---|---|---|---|
| 3,922,739 | A * | 12/1975 | Babintsev | 441/16 |
| 4,321,475 | A | 3/1982 | Grub | |
| 4,441,316 | A * | 4/1984 | Moody | 60/398 |
| 6,216,455 | B1 * | 4/2001 | Doleh et al. | 60/398 |
| 6,772,592 | B2 * | 8/2004 | Gerber et al. | 60/495 |
| 6,833,631 | B2 * | 12/2004 | Van Breems | 290/42 |
| 6,933,623 | B2 * | 8/2005 | Carroll et al. | 290/42 |
| 7,258,532 | B2 * | 8/2007 | Welch et al. | 417/333 |
| 7,781,903 | B2 * | 8/2010 | Buffard et al. | 290/42 |
| 7,952,218 | B2 * | 5/2011 | Welch et al. | 290/53 |

(Continued)

FOREIGN PATENT DOCUMENTS

| | | |
|---|---|---|
| CA | 2 467 287 A1 | 11/2005 |
| EP | 0867565 | 9/1998 |

(Continued)

OTHER PUBLICATIONS

International preliminary report on patentability No. PCT/US2011/027516 mailed on Sep. 20, 2012.

(Continued)

*Primary Examiner* — Nicholas Ponomarenko
(74) *Attorney, Agent, or Firm* — Sam Pasternack; MIT Technology Licensing Office

(57) ABSTRACT

A system for harvesting, storing, and generating energy, that includes floating structure supporting machinery to extract energy from wind, waves, surface generators, or currents. At least one energy storage and power generating unit is anchored to the seafloor and adapted to tether the floating structure to the unit. The unit includes an internal chamber into which water flows through a hydroelectric turbine to generate electrical energy. A pump is provided, powered by energy from the floating structure machinery, to evacuate water from the unit and a control system directs power from the machinery to pump water out of the unit during periods of excess energy extraction by the machinery and to allow water to flow into the chamber through the hydroelectric turbine to generate electrical energy during periods of lower energy extraction by the machinery. The same internal chamber design can be utilized to store hydrocarbons in the vicinity of undersea wellheads during "shut-in" procedures when the wellhead would otherwise be secured.

17 Claims, 24 Drawing Sheets

(56) References Cited

U.S. PATENT DOCUMENTS

| | | | |
|---|---|---|---|
| 7,980,832 B2* | 7/2011 | Ahdoot | 417/333 |
| 8,207,622 B2* | 6/2012 | Koola et al. | 290/42 |
| 8,624,418 B2* | 1/2014 | Deng | 290/53 |
| 2005/0271501 A1 | 12/2005 | Walters | |
| 2009/0206608 A1* | 8/2009 | Koola et al. | 290/53 |
| 2010/0107627 A1 | 5/2010 | Morgan | |

FOREIGN PATENT DOCUMENTS

| | | |
|---|---|---|
| JP | 2755778 B2 | 5/1998 |
| WO | 111861 A1 | 9/2009 |
| WO | WO 2009/111861 A1 | 9/2009 |
| WO | WO 2011/008153 | 1/2011 |

OTHER PUBLICATIONS

Kottenstette, R; Cotrell, J "Hydrogen Storage in Wind Turbine Towers", National Renewable Energy Lab Technical Report, Sep. 1, 2003.

Penney, T.R. "Power from the sea" Scientific American, vol. 256, No. 1, Jan. 1987, pp. 86-92.

Lindgren, Michael; Soederberg, David; Dahlgren, Anton "Design of the electrical system for offshore wind farms", Technical Report, Stockholm, Sweden, Feb. 15, 2008, p. 72.

"The year for wind storage? Energy storage for wind farms gains momentum" Smartgridnews.com, Apr. 19, 2011.

Greenlee, Alision S., "Design of Subsea Energy Storage Chamber", Thesis submitted to Department of Mechanical Engineering, Massachusetts Institute of Technology, 2009, Jun. 1, 2009, pp. 1-25.

International Search Report and Written Opinion issued in connection with International Patent Application No. PCT/US2011/027516 mailed on Aug. 12, 2011.

International Search Report and Written Opinion issued in connection with International Patent Application No. PCT/US2011/027516 mailed on Oct. 21, 2011.

* cited by examiner

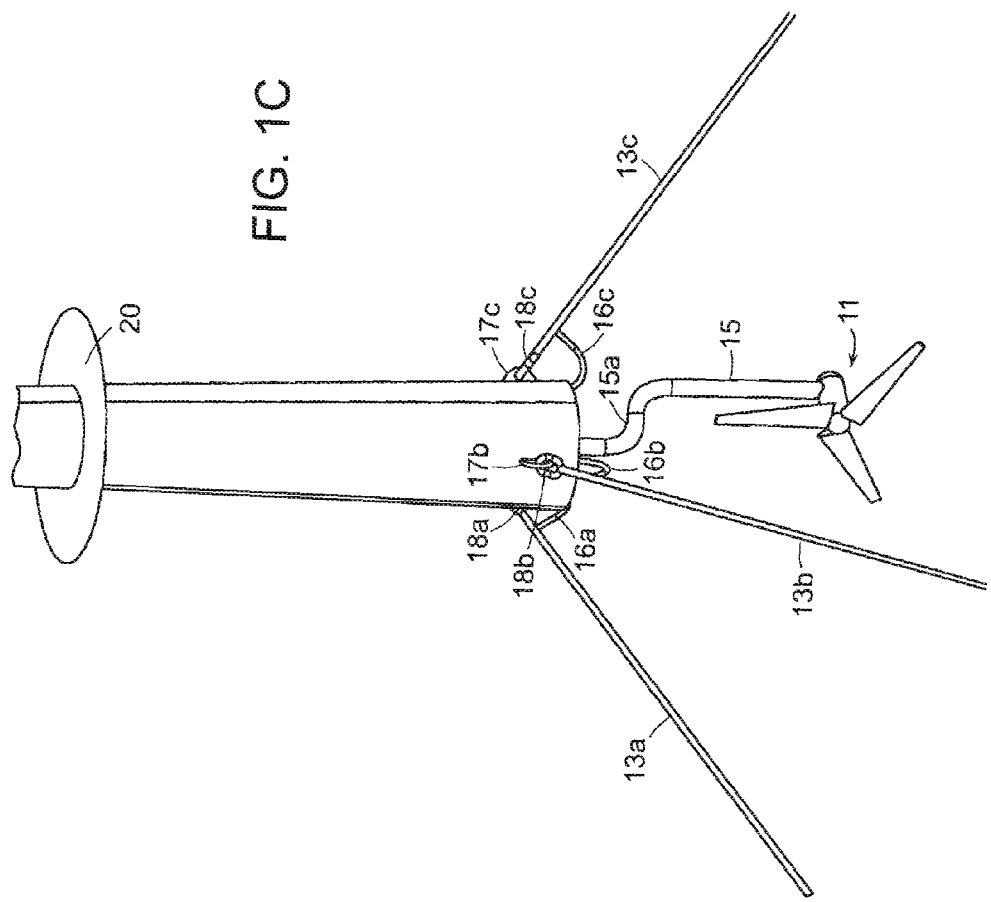
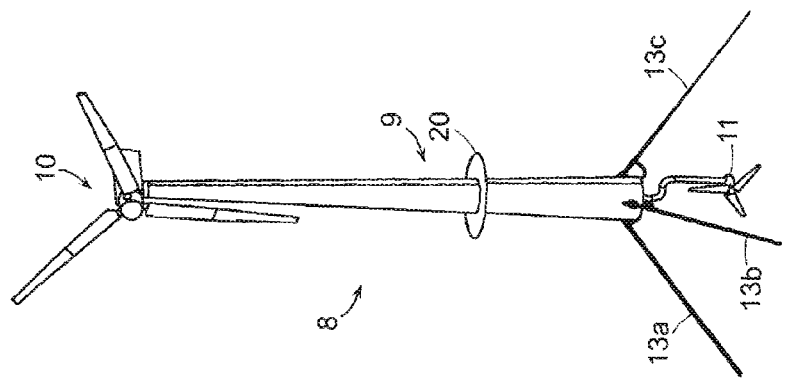

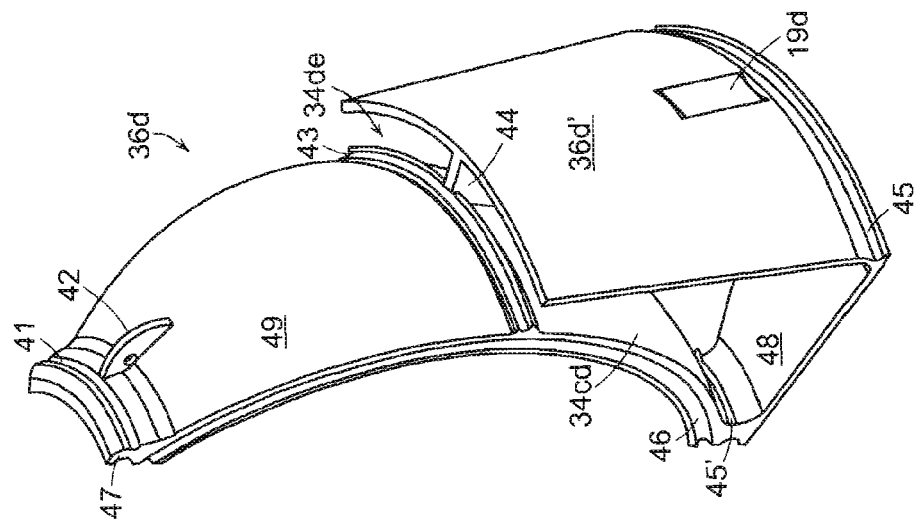
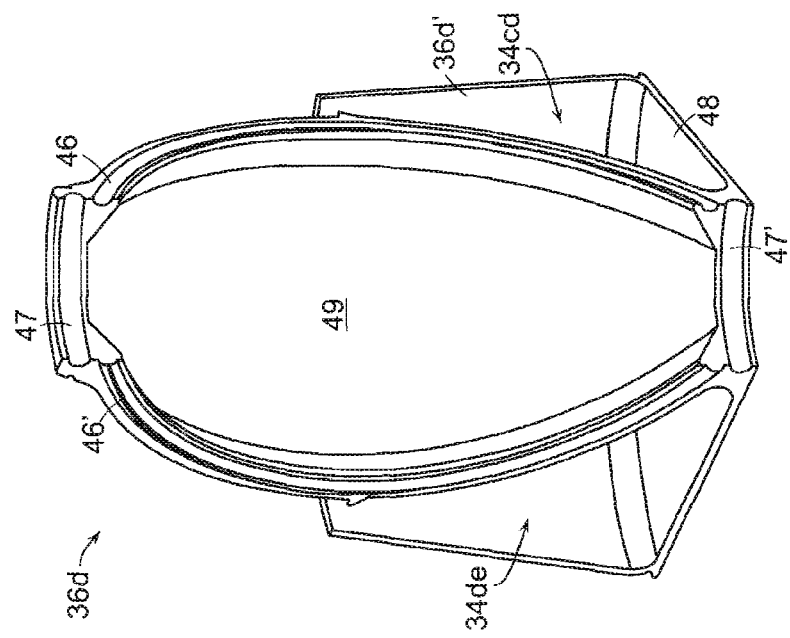
FIG. 4B
FIG. 4A

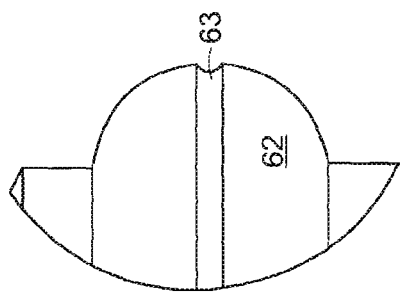
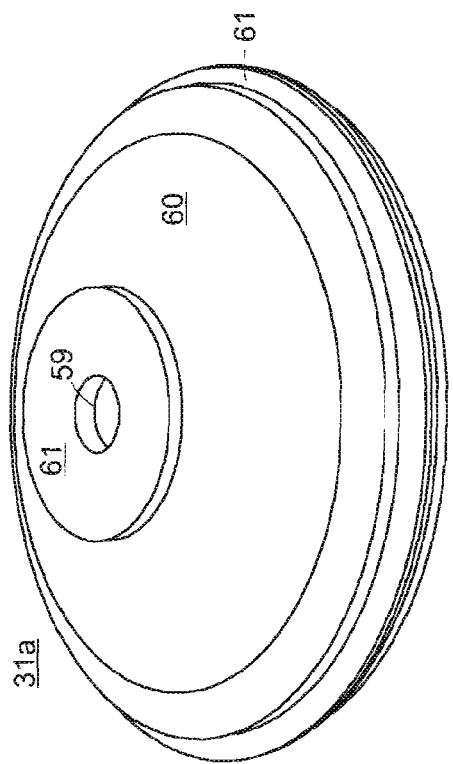
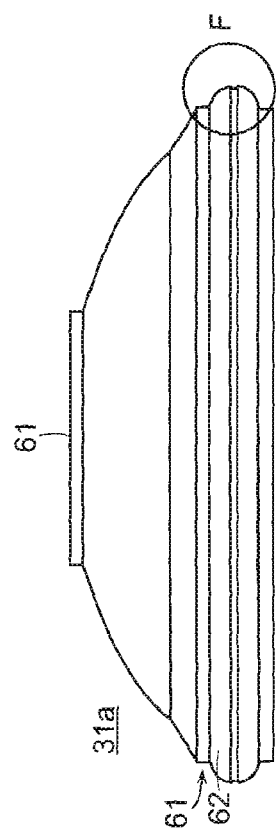
FIG. 5C
FIG. 5B
FIG. 5A

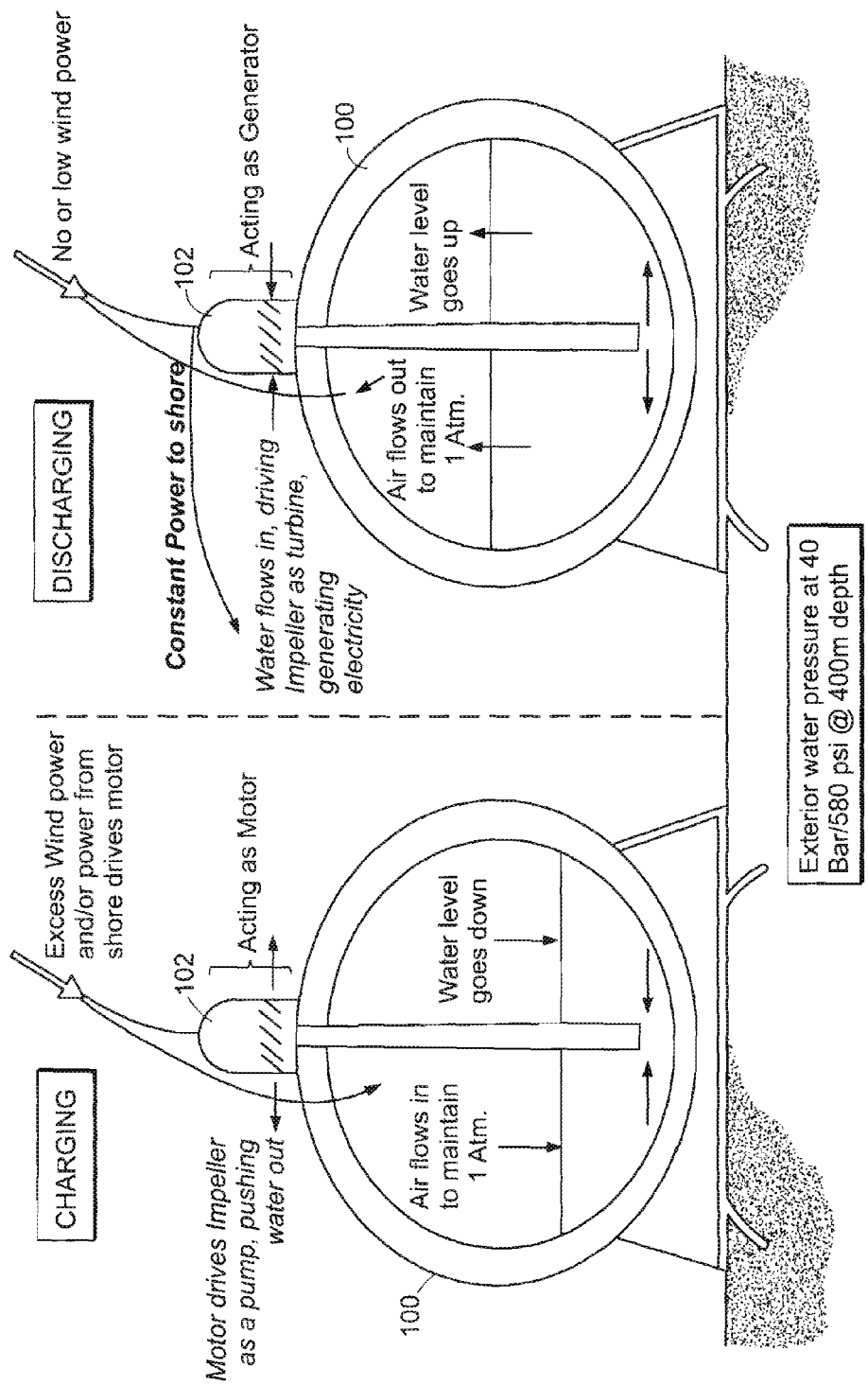

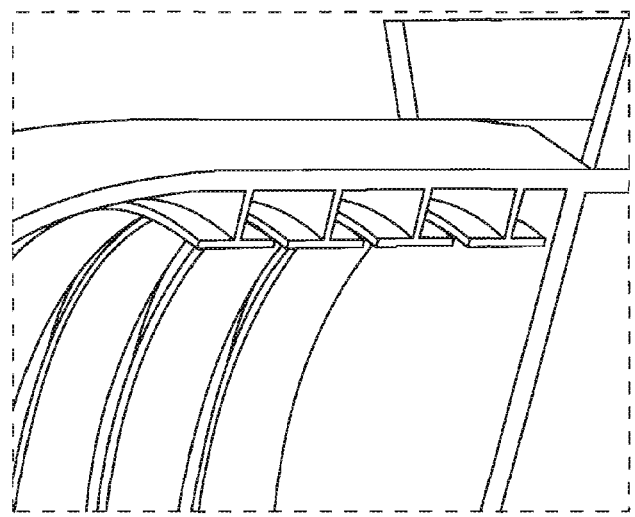
FIG. 21
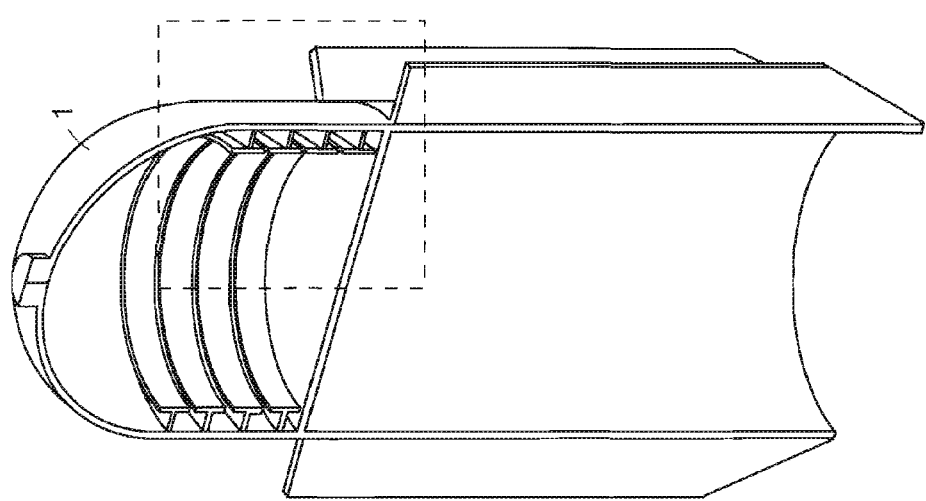

OFFSHORE ENERGY HARVESTING, STORAGE, AND POWER GENERATION SYSTEM

This application claims priority to provisional application Ser. No. 61/311,478 filed on Mar. 8, 2010, the contents of which are incorporated herein by reference.

STATEMENT REGARDING FEDERALLY FUNDED RESEARCH

No federal funds were used in the development of this invention.

FIELD OF THE INVENTION

This invention relates to a system for mooring floating offshore wind turbines and storing some of the energy harvested for producing electric power on demand during low wind and/or peak power demand periods.

BACKGROUND OF THE INVENTION

Wind and energy harvesting systems suffer from the problem of what to do when the winds are calm or wind speed varies significantly. The resulting variation of input from the wind energy source to the grid can cause trouble if the wind energy source makes up more than a few percent of the total capacity of the grid. Similarly, when the winds have high amplitude and the electric generators are running at maximum power, the excess power put into the grid can also cause troubles if it is not needed. Furthermore, there are times of peak demand when the price paid for electricity can be many times higher than off-peak, and thus it would be advantageous to be able to provide as much power as possible during peak demand.

It is well known that on land, excess wind power can be used to pump water uphill to a reservoir; however, this approach is often done with great environmental damage because the tops of mountains must be removed, or rivers dammed. Furthermore, water is pumped uphill into an open reservoir, and much is lost to evaporation.

Offshore, the emphasis has been on making the cheapest, most unimposing support structure possible for wind turbines. It has been assumed that when wind capacity is low, onshore generating stations will compensate for the fall in capacity. However, this is not the case when turbines are placed far offshore, where the wind is fairly regular. Far offshore, water depths greater than a hundred meters require wind turbines to be supported by floating structures which must be moored to the seabed. One existing example is the "Hywind" project in the North Sea which is operated by Norway's Statoil. Here, a wind turbine is mounted on a spar buoy moored to anchors and the generated power is transmitted along a cable attached to the mooring line. The cables run along the sea floor to a central station that can collect power from many systems and conditions it (e.g., turn it into high voltage DC so field lines do not couple with the salt water) to transmit it to land.

To ensure a reliable, demand-driven supply from these offshore turbines as wind speeds vary, an energy storage system with a capacity greater than 20% of the daily energy production capacity of the wind turbine (or 4 to 10 hours of storage) is needed. NREL has determined that storage can greatly improve increased penetration of renewable energy sources such as solar and wind, and storage is necessary if renewables are to be able to be used to satisfy baseload demand without acquiring additional combustion gas turbine reserves. Satisfying baseload demand is crucial to reducing $CO_2$ emissions by replacing coal power plants with baseload renewable power. The energy storage system is also needed to smooth out power spikes from the wind turbine so that the HVDC line to land can be sized for average power production.

Numerous studies have shown the benefits of load-leveling, in which fossil-fueled plants run at a constant base-load and storage is used to handle peak loads and is re-charged during off-peak periods. This approach allows power plants to run at a more efficient setting, minimizes wear and tear on the machinery as it ramps up and down daily, and reduces wasted power due to transmission losses during peak demand periods. Large-scale energy storage, especially near the greatest load centers along the coasts, would increase the amount of level loading available and can actually reduce fuel usage and reduce emissions, even despite efficiency losses of the storage device.

Furthermore, another application for the invention pertains to during hurricane season in the Gulf of Mexico, numerous oil platforms and rigs must conduct "shut-in" procedures in order for personnel to evacuate. During "shut-in" times production ceases which results in lost present-value profits during that period. A means of collecting oil during hurricane "shut-in" periods would allow the well to continue production without risking personnel safety. During the large oil leak, commonly referred to as the "Deepwater Horizon" event at the Macondo Prospect in the Gulf of Mexico, oil was eventually able to be collected as procedures and equipment to cap the well were developed. However, a tropical storm required evacuation of the ships collecting the oil and oil continued to leak while personnel evacuated the area. A means of collecting oil in deepwater at the site during this evacuation period would have reduced the total amount of oil spilled.

An object of this invention, therefore, is to provide an offshore energy storage and electric power generation system structure that can moor offshore energy harvesting machines (e.g., wind turbines, water turbines, wave energy machines) and also provide energy storage capability.

A further object of the invention is to provide energy storage capacity with a large chamber deep below the surface of the ocean into which water can flow past hydro turbines to generate electricity when the amplitude of wind, currents, and/or waves is low in order still to generate electricity continually.

A further object of the invention is to provide energy storage capacity with a large chamber deep below the surface of the ocean from which water can be pumped using hydro turbines to generate energy storage capacity when the amplitude of wind, currents, and/or waves are such that they are generating excess electricity.

A still further object of the invention is to use a heavy ballasted structure to anchor the energy harvesting structure to the sea floor by virtue of its mass.

A still further object of the invention is to hold the structure in place on the sea floor by piles, grouting, or suction anchors.

A still further object of the invention is to use a central energy storage/generating chamber to serve the needs of multiple surrounding wind, ocean current and/or wave energy harvesting machines.

A still further object of the invention is to load-level onshore power plants for increased overall efficiency, reduced emissions, and reduced fuel usage.

A still further object of the invention is to store hydrocarbons in the vicinity of undersea wells during hurricane shut-in procedures and during potential well leaks, allowing more rapid retrieval of the hydrocarbons once oil platform/rig operations are allowed to continue safely.

A still further object of invention would be to store energy hydraulically for powering offshore oil platforms and subsea equipment in the case of generator failure. Subsea equipment is presently powered by generators located on platforms that transmit power to the floor with large subsea umbilical cables. If there is an interruption of power on the surface (generator failure), this invention could provide backup power during this down time.

Other and further objects will be explained hereinafter and more particularly delineated in the appended claims.

SUMMARY OF THE INVENTION

In one aspect, the invention is a system for harvesting, storing and generating energy including a floating structure supporting machinery to extract energy from surface generators, wind, waves or currents. At least one energy storage and power generating unit is anchored to the sea floor and adapted to tether the floating structure to the unit. The unit includes an internal chamber into which water flows through a hydroelectric turbine to generate electrical energy and a pump is provided to evacuate water from the unit. The pump is powered by energy from the floating structure machinery. A control system is provided to direct power from the machinery to pump water out of the unit during periods of excess energy extraction by the machinery and to allow water to flow into the chamber through the hydroelectric turbine to generate electrical energy during periods of lower energy extraction by the machinery.

In a preferred embodiment, the machinery includes a wind turbine and/or a water turbine and/or a wave extraction device. In a preferred embodiment, the energy storage and power generating unit is made of a combination of precast concrete elements and high strength steel components. The pump may be a reversible hydroelectric turbine. Alternatively, the pump may be a positive displacement pump. The energy storage and power generating unit is combined with the mooring apparatus to form a single structure. A preferred mooring method is to use the mass of the structure itself. Where high currents may be present or for soft bottoms, suction piles may be used.

In another preferred embodiment, the energy storage and power generating unit is anchored to the sea floor by virtue of its mass. The precast concrete elements are preferably held together by post-tensioned cables. A hydraulic wind turbine may be used to distribute hydraulic power in yet another embodiment.

The invention thus comprises a subsea structure with a chamber that is anchored to the sea floor by either gravity or soil friction to resist mooring cable loads caused by the forces of wind on the turbine and waves and currents on the supporting floating structure for the energy harvesting machines. The chamber can be made very large, tens of meters in diameter, with the use of precast concrete segments that are then held together with post-tensioned cables. Water can be pumped from the chamber to store potential energy until the wind current, or wave amplitude becomes low. Valves can then be opened and water can flow into hydroelectric turbines in the subsea structure to generate electricity for the grid. When excess power is being generated in times of good wind, current or wave amplitude, the hydro turbines can be powered and run in reverse to pump out the water from the subsurface volume to prepare for the next period of calm. Alternatively, turbines can be used for power generation, and positive displacement pumps can be used to pump water from the chamber.

BRIEF DESCRIPTION OF THE DRAWING

FIG. 1b is a close-up view of the floating structure of FIG. 1a.

FIG. 1c is a close-up view of the bottom of the floating structure.

FIG. 2 is an isometric view of an array of the energy harvesting and storage systems shown in FIG. 1a.

FIG. 4a is an isometric view of one of the modules used to create the energy storage structure in an embodiment of the invention.

FIG. 4b is a front perspective view of one of the modules used to create the energy storage structure according to an embodiment of the invention.

FIG. 5a is a side view of a top cap in an embodiment of the invention.

FIG. 5b is an isometric view of the top cap of FIG. 5a.

FIG. 5c is a close-up side view of the top cap of FIG. 5a.

FIGS. 6a and 6b are schematic illustrations of another preferred embodiment of the energy harvesting and storage system disclosed herein.

FIG. 21 is a close-up isometric view of FIG. 19 that shows the T-beams that line the inner walls of the energy storage device.

DESCRIPTION OF THE PREFERRED EMBODIMENT

The present invention relates to a system for harvesting wind and ocean current energy offshore and storing it and/or converting it to electrical energy for transmission to shore. Supporting a large floating wind turbine in deep water requires mooring a floating structure (e.g., a large spar buoy) against large waves and high winds. Mooring lines run from the floating wind turbine to heavy deadweight anchors on the seafloor. The invention herein replaces heavy deadweight anchors with deadweight ballasted chambers from which water can be pumped to provide energy storage in the form of a void near the seafloor. Water flowing through a turbine back into the pumped-out void is then used to generate usable power. An analogy is a pumped hydroelectric system, such as commonly used at the base of onshore dams which is used to pump water into a lake to store energy, and it generates electricity by letting water flow past a turbine.

Figure 17:
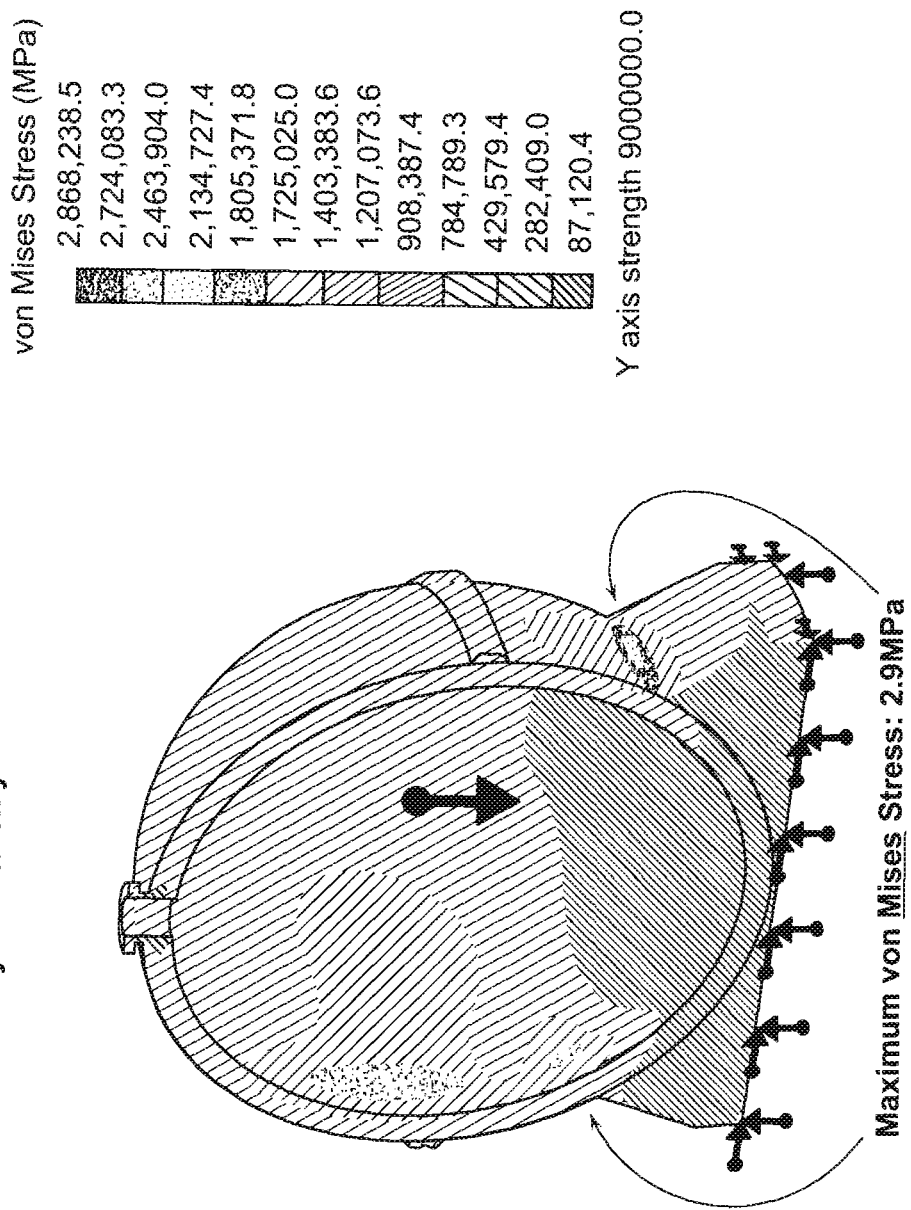
FIGS. 17 and 18 are illustrations showing stress analysis on preferred embodiments of the invention.
Figure 18:
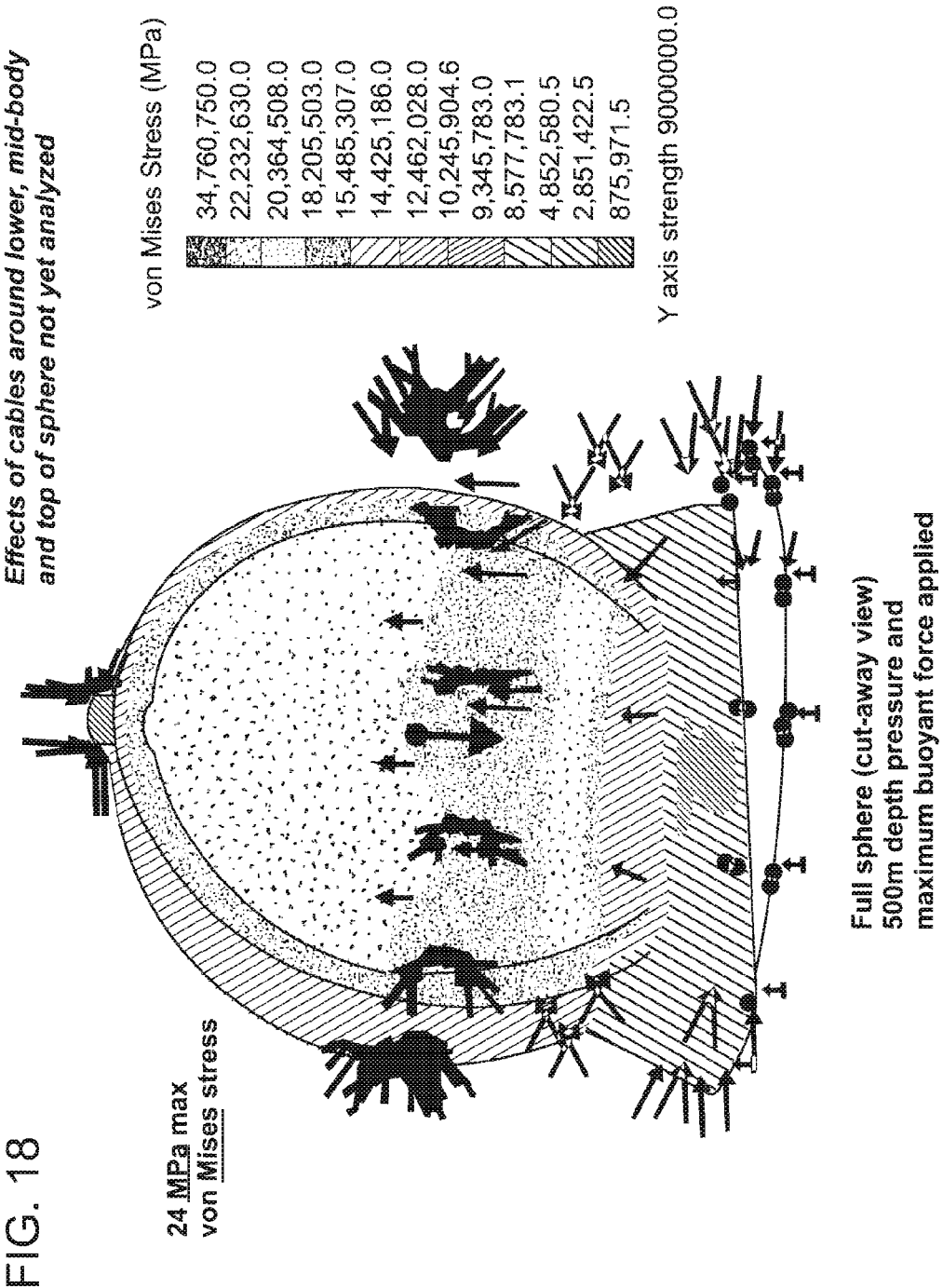
Figure 20:
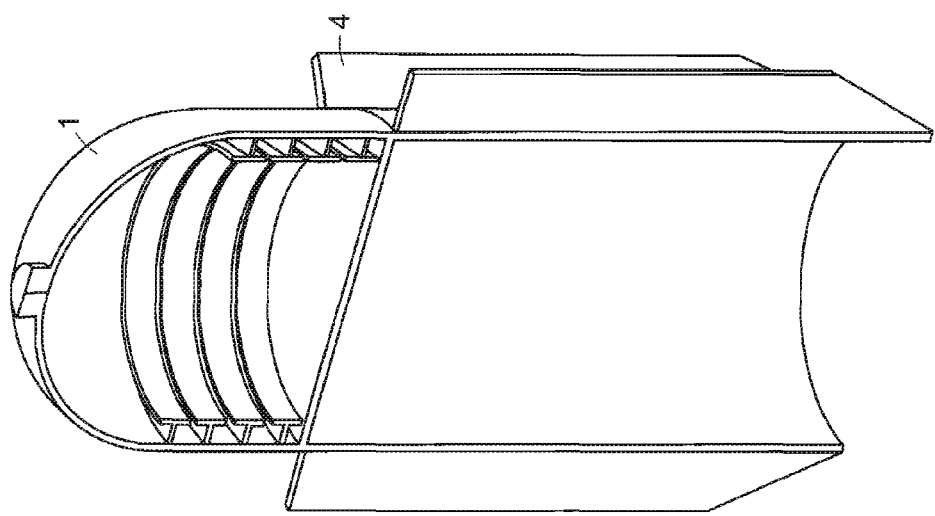
FIG. 20 is an isometric cutaway of the FIG. 19 embodiment.
Figure 19:
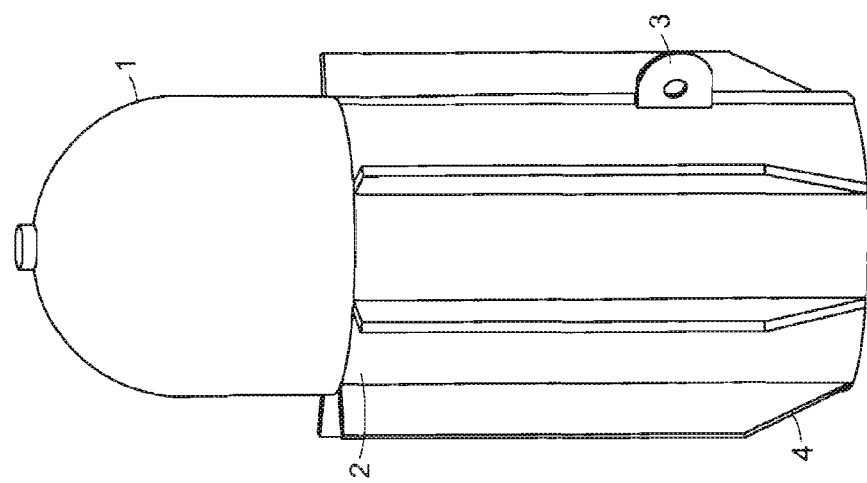
FIG. 19 is an isometric view of a preferred embodiment of the invention for non rocky soil type that utilizes a suction pile for anchoring the storage device to the ocean floor.

FIGS. 1a through 5c describe a early embodiment of the invention. The current preferred embodiment of the invention for rocky soil is shown in FIG. 6 and FIGS. 8-18, wherein an embodiment is comprised of two hemispherical pieces. The preferred embodiment of the invention for non rocky soil is shown in FIGS. 19-21 where a suction pile is used to anchor the structure. Nevertheless, many of the details in FIGS. 1a through 5c remain applicable and germane to the currently preferred embodiment.

Figure 1A:
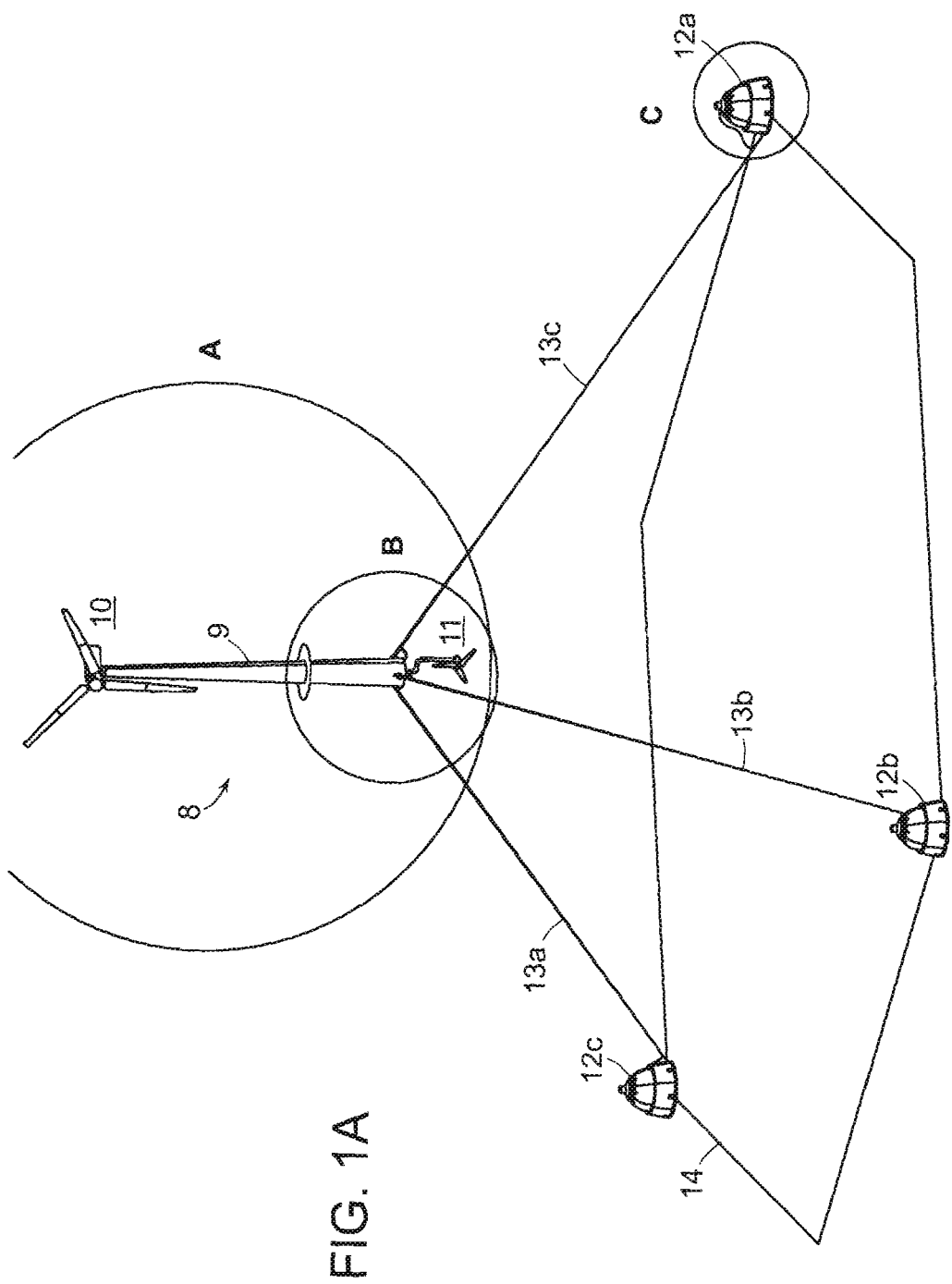
FIG. 1a is an isometric view of a single floating structure with a wind turbine and ocean current turbine attached in which the structure is moored with three lines to three energy storage structures.
Figure 1D:
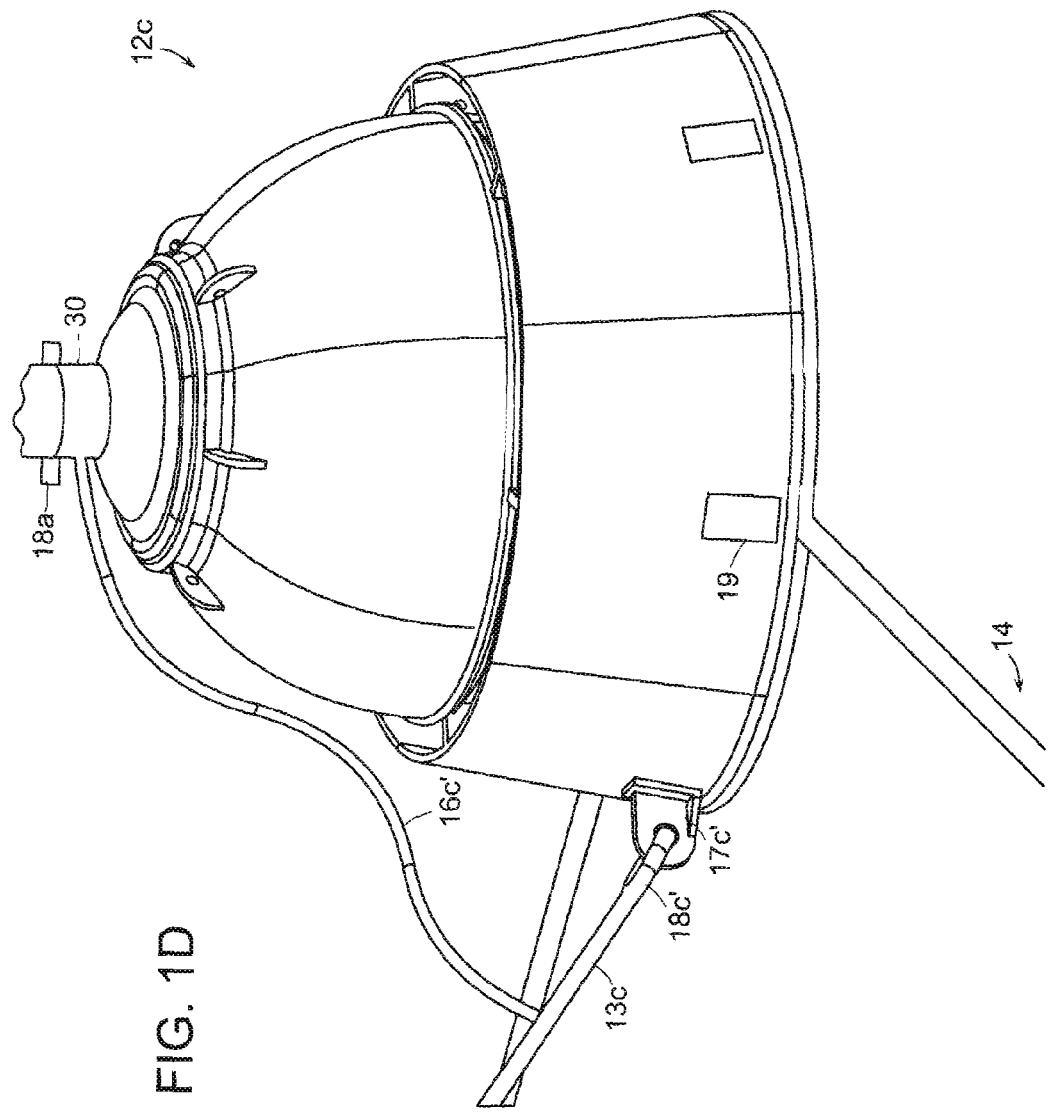
FIG. 1d is a close-up view of one of the energy storage structures according to an embodiment of the invention.
Figure 2:
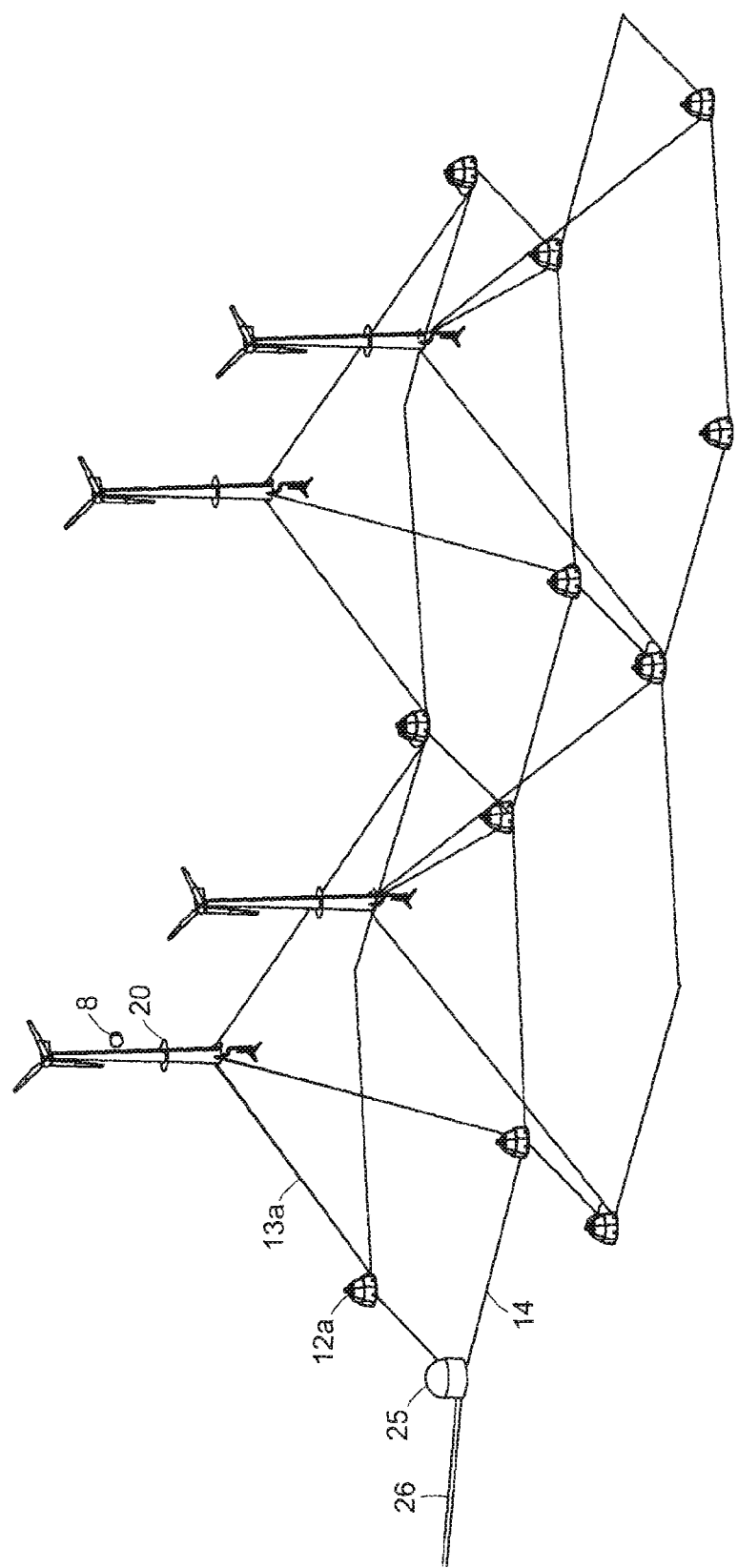

A first embodiment of the invention is shown in FIGS. 1a-1d. Floating wind turbines 8 are connected to the mooring via a catenary line 9 or Tension Leg Platform (TLP) with a wind turbine 10. The turbines may have an ocean current energy harvesting turbine 11 suspended from the spar below the water line. Mooring lines 13a, 13b, and 13c anchor the wind turbine system 8 to energy storage units 12a, 12b, and 12c. Hexagon shaped electrical cabling system 14 connects the storage units to other systems so an entire grid of such systems can be achieved such as shown in FIG. 2.

FIGS. 1b and 1c are a close view of the wind turbine system 8, wherein 20 represents the surface of the water in which the spar buoy 9 floats. Mooring lines 13a, 13b, and 13c also contain power lines 16a, 16b, and 16c which take power from the wind turbine 10 and deliver it either to the storage units 12 via power line connections 16a', 16b', and 16c' (only the 16c' line is shown in FIG. 1d) or to the grid 14 so that it can be sent ashore via central station 25 and power line to shore 26 (FIG. 2). Mooring lines 13a, 13b and 13c have Clevis-type ends 18a, 18a' and 18b, 18b' and 18c, 18c', respectively, which connect to padeyes 17a and 17b and 17c respectively on the spar buoy 9 near its submerged end and to padeyes 17a', 17b' and 17c' on the storage chamber 12 (only the 17c' padeye is shown in FIG. 1d). The padeye 18c' is attached (e.g., bolted) to a boss such as 19 at the base of the storage chamber 12. The three mooring lines thus maintain the position and orientation of the wind turbine system 8.

In one embodiment, a conventional wind turbine would be used that generates electricity, and electric power is transmitted to the seafloor by power lines 16. The electric power could be conditioned in the wind turbine or in a power station 25. In a second preferred embodiment, a hydraulic wind turbine, such as developed by Chapdrive Corp. (Norway) would send hydraulic power through the power lines 16. The fluid power could turn the pumps in the pumped hydro system 30 that empty the storage chambers such as 12c, and electricity is created by water at depth flowing into the storage chamber 12c via the pumped hydro system 30. The second preferred embodiment uses a hydraulic pump to continually pump water out of the storage chamber 12c, and the pump is driven by hydraulic pressure and flow created by the wind turbine. Meanwhile, electric power is created on demand by water flowing through a turbine (not shown) in the pumped hydro system 30, wherein the turbine can operate at very high speed and hence the electric generator can run very fast and efficiently. The ports 30a and 30b are for water to be pumped out of the chamber 12 and for water to flow in past the turbine (not show) in the pumped hydro system 30. Inside the chamber (shown in FIG. 3b) a stem 30c contains connections to input/output ports 30d and 30e. The system thus acts like a hydraulic transmission element to convert high pressure fluid from the turbine, which may be at an irregular flow rate due to wind speed variations, into constant electric power.

A trash handler such as a wiper or auger or backflow device can be used to self-clear ports 30a and 30b to prevent debris injested during turbine operations from blocking the pump mechanism. In either embodiment, a 5 MW peak electric power wind turbine would have blades on the order of 60 meters long and the tower that is an integral part of the spar buoy would rise about 120 meters above the surface of the water. The bottom of the spar buoy would be about 50-100 meters below the surface. At this depth strong ocean currents and little debris/seaweed exist so a water turbine such as 11 could be mounted with a structure 15 to the bottom of the buoy. The structure could have an offset 15a so that the current keeps the turbine aligned with the current.

Figure 3A:
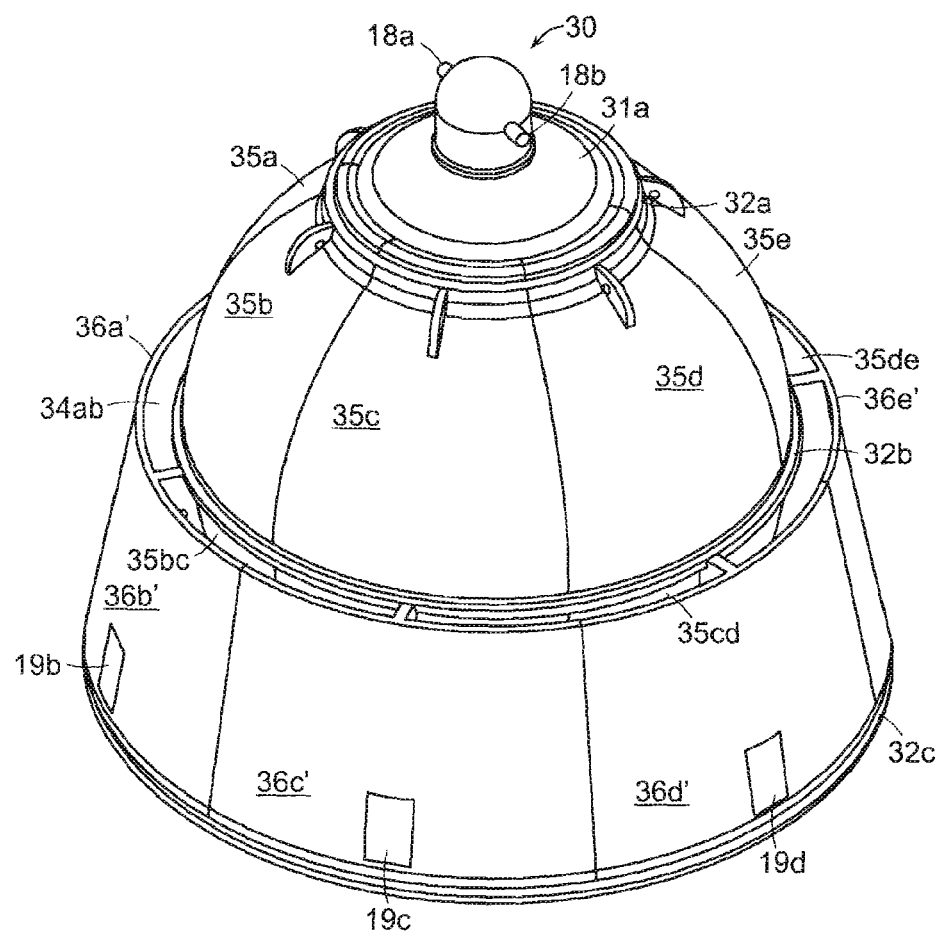
FIG. 3a is an isometric view of the energy storage structure of an embodiment of the invention.
Figure 3B:
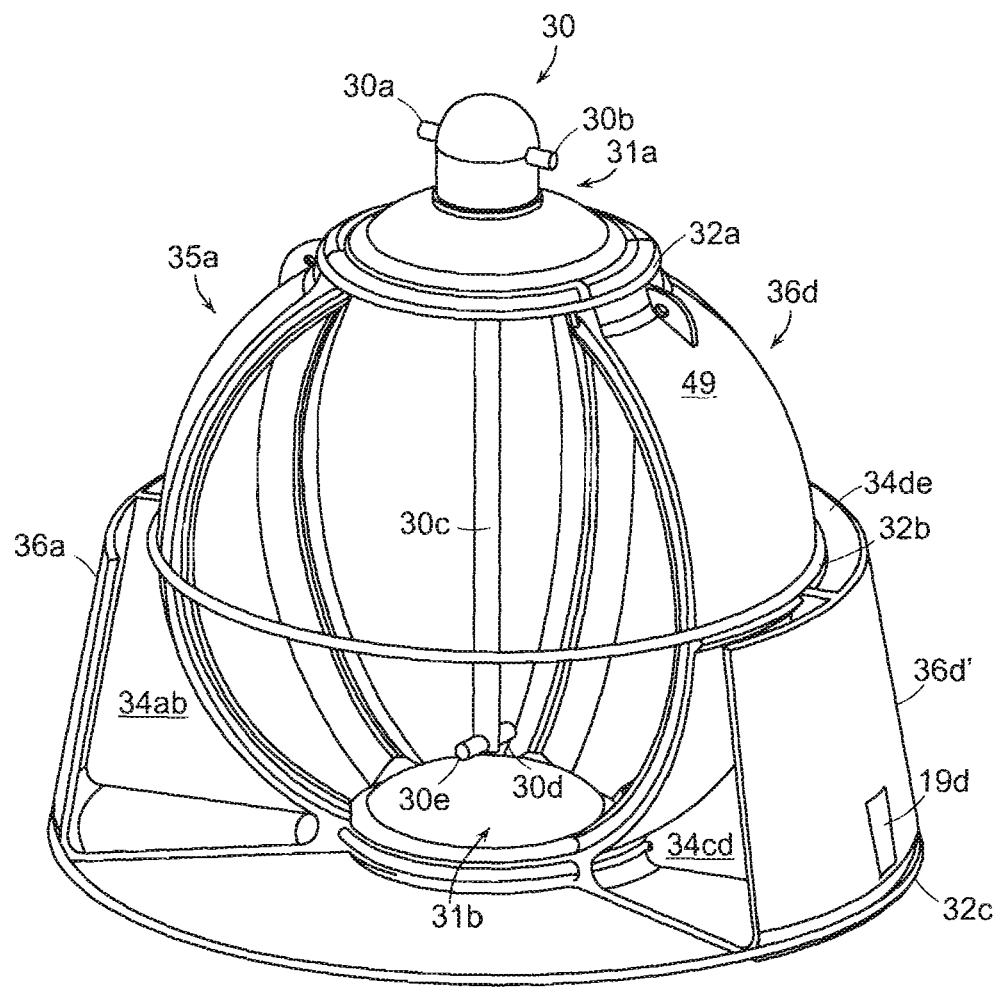
FIG. 3b is an isometric view of the energy storage structure with two of its modular segments removed to show the interior.

FIGS. 3a and 3b show just the storage chamber 12 with the pumped hydro system 30, wherein FIG. 3b shows the same system as in FIG. 3a but with some of the module elements that make up the structure removed so that the nature of the structure and its interior can be seen. The structure is made of segments 35a, 35b, 35c, 35d, 35e, and 35f (not shown) each of which are made as precast concrete segments and together form a spherical chamber from which water can be pumped, or flow into, for energy storage or power generation. An elliptical dome top cap 31a and similar bottom cap 31b act as the ends to the structure. Rings (typically stainless steel cables) 32a, 32b, and 32c hold the structure together, and the hydrostatic water pressure further acts to keep the structure intact even when the inside void is pumped out. The structure is thus similar in construction to a barrel. The exception is that the outer skirt segments 36a', 36b', 36c', 36d', 36e', and 36f (not shown) create regions 34ab, 34bc, 34cd, 34de, and 34ef and 34fa (not shown) that are filled with ballast, such as sand or gravel, to keep the structure on the seabed, even when water inside the central spherical chamber is pumped out. This enables the structure to also serve as a mooring structure, and thus padeyes for the mooring cables can be attached to any of the bosses 19a (not shown), 19b, 19c, 19d, 19e, and 19f (not shown) as needed.

FIGS. 4a, 4b, 4c, and 4d show one of the sections 36d that make up a storage system 12. The spherical chamber wall 49 has longitudinal stiffeners 46 and 46'. 46' has a male protuberance 56' and 46 has a mating female shape 56 such that when one section is placed next to another the male mates with the female to form a stronger joint than if they were just flat surfaces, for unlike white oak in a barrel, the concrete structures will not expand and seal against each other. In fact, as shown in close-up in FIG. 4d, the male 56' has a groove 58 in it into which a sealing grout or elastomer can be pumped once the structure has been assembled. Similarly, female grooves 57 and 57' (not shown) in circumferential stiffeners/bosses 47 and 47' respectively receive male protuberances in caps 31a and 31b as shown in FIG. 3b. Semi-round grooves 41, 43 and 45 (and 45') serve as seats for circumferential hoop cables (such as 32a, 32b, and 32c shown in FIG. 3b) to preload the sections against each other, much like barrel hoops in a traditional barrel. Outer skirt wall 36d' is connected to the chamber wall 43 by rib 44 and base 48. Padeye 42 can be used to help lift the section during construction, or emplacement. Although large, in this embodiment about 30 meters tall, the segments 36 can still be cast from concrete, in much the same manner that precast concrete structures currently are manufactured for items like sewer pipe.

Figure 4C:
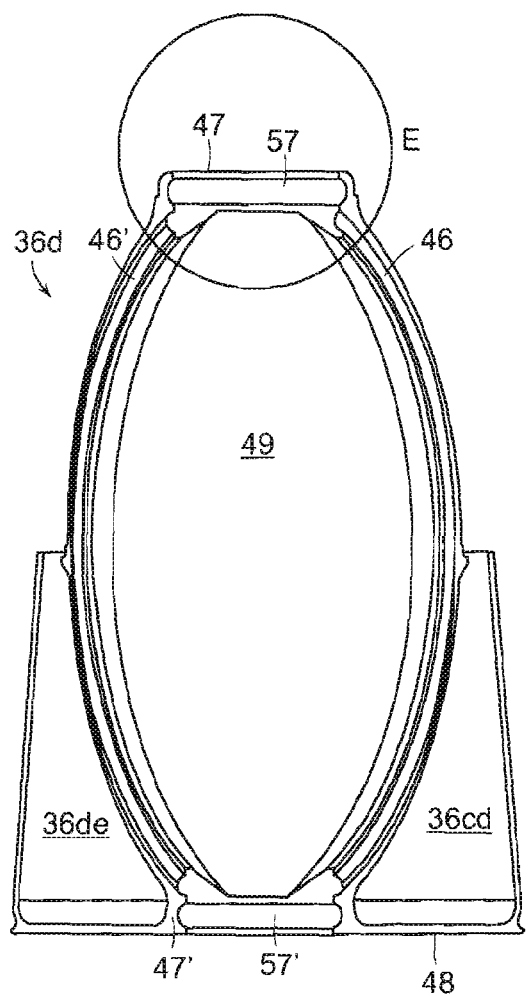
FIG. 4c is a view looking outward from the center of one of the modules disclosed herein.
Figure 4D:
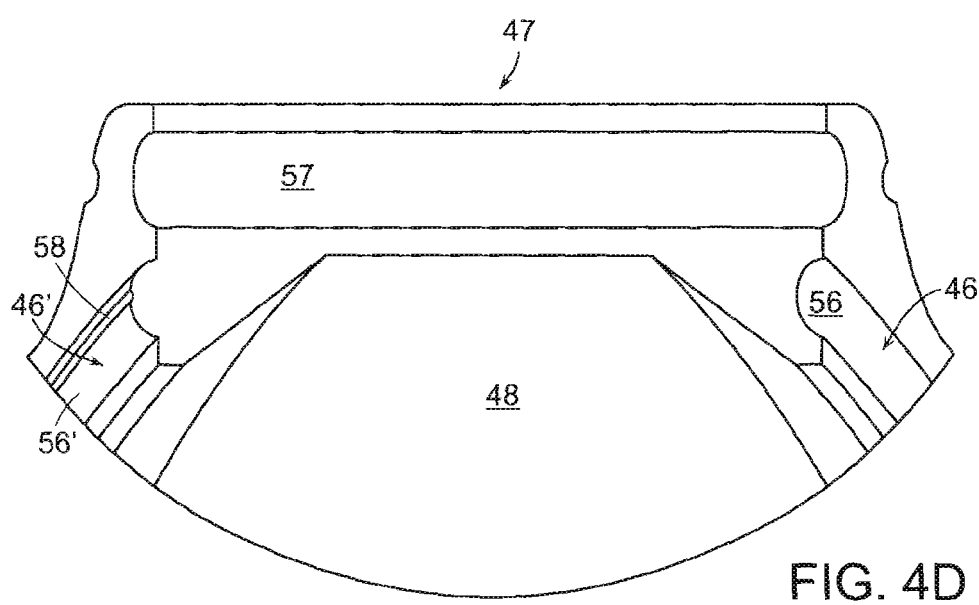
FIG. 4d is a close-up isometric view of the joints of the module.

FIG. 4c shows the modular segment 36d from the perspective of looking out of the center of the spherical chamber's center. FIG. 4d shows a close-up detail near the top of the segment. Longitudinal stiffening (and anti buckling) ribs 46 and 46' are triangular-like in section such that a central mold core can be pulled relative to the segment to release it; in other words, there are no interior undercuts that would prevent molding. The cavities 36de and 36cd can be formed by mold cores that pivot about an axis coincident with the center of the spherical chamber. The outside of the structure can have another mold section that moves radially away with respect to the central core. The only "side pulls" required are the small holes in padeye 42 and in rib 44 near the groove 45', but these could actually be mold inserts that remain once the mold sections are pulled away.

FIGS. 5a, 5b, and 5c show the top cap 31a for the system. A bottom cap 31b is the same except it does not need the top boss 61 with hole 59 for the pumped hydro module 30. The top structure would typically have an elliptical cross section as is commonly used for pressure vessels, although it could be spherical. Circumferential rib 61 adds strength and stiffness, and male protuberance 62 mates with female grooves 57 in the circumferential bosses 47 in modular segments 36. The male protuberance 62 has a groove 63 in it that allows grout or an elastomer to be pumped into it to seal the structure once assembled. With regard to some typical parameters Table 1 below shows the overall elements of an array of wind turbines and storage elements to provide 100 GW baseload power as a further goal to replace coal power plants as baseload power. Table 2 below shows the overall elements of an array of wind turbines and storage elements to provide 3 GW baseload power, which would be an initial goal to supply 10-20% renewable energy into most regions in the US.

TABLE 1

Electricity generation and storage system parameters for 100 GW baseload system

| Wind Farm | | Storage spheres | |
|---|---|---|---|
| wind turbine size (MW) | 5 | hours energy storage required | 4 |
| blade diameter (m) | 120 | Energy storage required (MWe-hr) | 400,000 |
| turbine spacing/blade diameter | 5 | diameter (m) | 25 |
| area per turbine (km$^2$) | 0.36 | water depth (m) | 330 |
| capacity factor | 50% | system efficiency | 0.7 |
| total electrical energy per day (MWh) | 60 | MWe-hr/unit | 4.95 |
| % energy storage/turbine | 16% | number of units/turbine | 2 |
| 24/7 GW desired | 100 | Energy storage/turbine | 9.9 |
| Number of turbines | 40,000 | number of units | 80,812 |
| area required (km$^2$) | 14,400 | Number years to build system | 6 |
| width of area (km) | 160 | days per year | 300 |
| length of area (km) | 90 | units per day | 45 |

TABLE 2

Electricity generation and storage system parameters for 3 GW baseload system

| Wind Farm | | Storage spheres | |
|---|---|---|---|
| wind turbine size (MW) | 5 | hours energy storage required | 10 |
| MW/km$^2$ (NREL estimate) | 5 | Energy storage required (MWh) | 30,000 |
| area per wind turbine (km$^2$) | 1 | diameter (m) (approx) | 22.03 |
| capacity factor | 50% | water depth (m) | 500 |
| total electrical energy per day (MWh) | 60 | turbine efficiency | 0.8 |
| % energy storage/turbine | 40% | MWh/unit | 5.96 |
| 24/7 GW desired | 3.0 | number of units/turbine | 4 |
| Number of turbines | 1,200 | Energy storage/turbine | 23.9 |
| area required (km$^2$) | 1,200 | number of units | 4,800 |
| width of area (km) | 60 | Number years to build system | 6 |
| length of area (km) | 20 | days per year | 300 |
| | | units per day | 3 |

Table 3 shows representative system design parameters and Table 4 shows the systems cost such that a reasonable return on an investment of 12 years can be achieved. Consider though the required wholesale sale price of electricity estimated for the case without storage which is only slightly less than the price with storage. It may not thus make sense for an individual investor to include storage given some of the risks; however, without storage the system may not be deemed reliable enough to depend on to justify the lower price. In addition, on a large renewable systems scale, expensive gas turbine generators must be kept ready on land as ready reserve or spinning reserves. As NREL concluded, storage is a must if solar or wind energy are indeed to provide greater than 20-30% of the U.S. energy needs. Even when renewable sources supply 10-20%, additional reserves and transmission upgrades are required; storage can alleviate the need for these requirements, especially for offshore wind supplying the large coastal load centers.

TABLE 3

Representative system design parameters

| Wind turbine | |
|---|---|
| wind turbine peak power (MW) | 5 |
| capacity factor | 50% |
| offshore turbine cost ($/Wpeak) | $ 3.00 |
| wind turbine cost ($) | $15,000,000 |
| Storage system | |
| number of spheres per floating turbine | 2 |
| sphere diameter (m) | 25 |
| volume of each sphere (m$^3$) | 8181 |
| water depth (m) | 300 |
| pumped hydro system efficiency | 0.7 |
| total MWe-hour energy stored | 8.96 |
| Storage sphere structure | |
| allowable compressive stress (MPa) | 50 |
| density of structural material (kg/m$^3$) | 2900 |
| ratio stiffener/shell volume | 0.7 |
| required wall thickness (m) | 0.375 |
| total volume sphere concrete (m$^3$) | 1252 |
| mass of each sphere (metric tonnes) | 3630 |
| total volume of conical ballast skirt concrete (m$^3$) | 823 |
| mass of conical concrete ballast containment structure (tonnes) | 2387 |
| total concrete volume (m$^3$) | 2075 |
| total concrete mass (tonnes) | 6017 |
| weight of required ballast (tonnes) | 3942 |

TABLE 4

Estimated system operating costs

Manufacturing cost

| | |
|---|---|
| concrete unit cost ($/tonne) | $400 |
| ballast unit cost ($/ton) | $50 |
| total cost per sphere ($) | $2,604,091 |
| deployment/mooring cost | |
| unit ($/tonne) | $300 |
| total cost per sphere ($) | $1,089,004 |
| pumped hydro cost | |
| unit ($/W) | $1.00 |
| total ($) | $5,000,000 |
| total storage system cost ($) | $12,386,188 |

Power transmission to land

| | |
|---|---|
| tranamission unit cost ($/W) | $0.50 |
| total power transmission system cost per turbine ($) | $2,500,000 |

| | With storage | Without storage |
|---|---|---|
| System | | |
| total system capital cost | $29,886,188 | $18,589,004 |
| maintanance | | |
| % of initial capital cost per year | 5% | 5% |
| ROI period (years) | 12 | 12 |
| annual cost ($/year) | $1,494,309 | $929,450 |
| equivelant total over ROI period | $17,931,713 | $11,153,402 |
| total cost of ownership (over ROI period) | $47,817,901 | $29,742,406 |
| effective cost per installed 24/7 Watt ($/W) | $19 | $12 |
| Operation | | |
| total hours of turbine operation/day | 12 | 12 |
| total hours/day electricity from turbine sold at average price | 7 | 12 |
| total hours/day electricity from storage sold at peak price | 5 | 0 |
| peak price mulltiplier | 2.5 | 0 |
| average cost of electricty ($/kWh) | $ 0.112 | $ 0.113 |
| gross margin (%) | 20% | 20% |
| average wholesale electrcity cost ($/kWh) | $ 0.134 | $ 0.136 |

With reference now to FIGS. 6a and 6b, there is shown enclosure 100 from which water may be withdrawn as shown in FIG. 6a and into which water will return to generate power as shown in FIG. 6b. When excess power is available and the spheres in FIG. 6 are to be charged, power is sent (either from shore or from the wind turbine) to operate the pump/turbine 102 and water is pumped out. The sphere 100 could be pumped down to a near vacuum or a vent line to the surface could maintain atmospheric pressure inside the sphere 100 (some variation in pressure is expected based on the diameter of a vent line and flow rate, but this differential pressure is not expected to exceed 0.1 Bar during maximum charge/discharge rates). With a vent line, the system stores slightly more energy and would reduce pump cavitation worries.

When the sphere 100 is completely empty it is considered "charged" and is ready to supply power as needed. Power is generated by allowing water to flow back into the pump/turbine 102, driving the impeller backwards and turning the motor into a generator. Power electronics ensure this power is sent to shore and/or combined with the wind turbine's power output in order to maintain a desired supply of power to shore.

Because of the size of the sphere 100, a significant amount of ballast is required in order to keep the sphere 100 safely anchored to the bottom of the sea floor and provide sufficient ballast for securing a floating wind turbine system. The shell thickness of the sphere 100 must be sufficient to handle the hydrostatic pressure at the sphere's water depth. A shallower water depth requires a thinner shell, while deeper depths would require a thicker shell. Maximum safe depth is a function of the concrete strength, the sphere's inner radius, shell thickness and a factor of safety.

Ballast requirements are determined by estimating the total displacement of the sphere 100 (based on the volume of the sphere and a small, conical base) and the total weight of the sphere (based on the volume of concrete). In order for the sphere 100 to remain on the bottom of the ocean and still provide sufficient ballast for the floating wind turbine, its weight has to be 500 mt greater than its displacement. The interior volume was determined from the desired energy storage. An inner radius was determined from the interior volume. Desired shell thickness to create a sphere with overall required weight was solved using a computer code. In an embodiment of a 25 m diameter sphere, the required shell thickness (approximately 1.95 m) corresponds to a maximum safe depth of approximately 700 m using 34.5 MPa (5,000 psi) concrete and a factor of safety of 1.5.

As mentioned above, a vent line is a design feature undergoing analysis that may allow pumping and turbine operations at a nearly constant differential pressure between the sea water outside of the sphere 100 and atmospheric pressure at the water surface. The pump/turbine 102 blades may be designed for optimum performance based on the pressure head. It is currently contemplated that the pump/turbine 102 blades will be a centrifugal design similar to other pumped hydro system designs. If a vent line is deemed necessary for higher efficiency or lower pump-turbine costs, detailed analysis of the vent line sizing and materials will be done for lifecycle cost comparison with a vent-less design.

Figure 7:
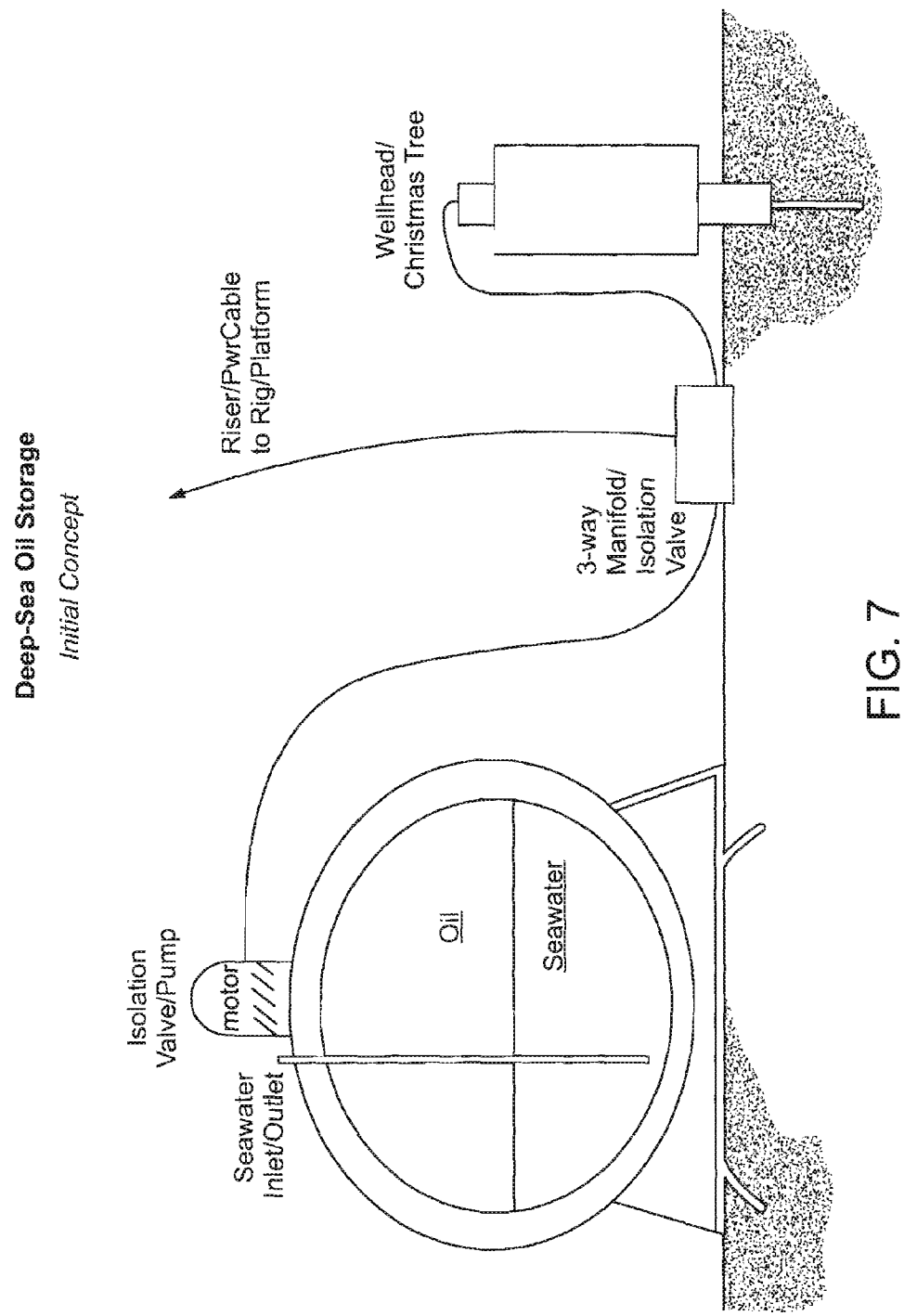
FIG. 7 is a schematic view of structure for deep-sea oil storage.
Figure 8:
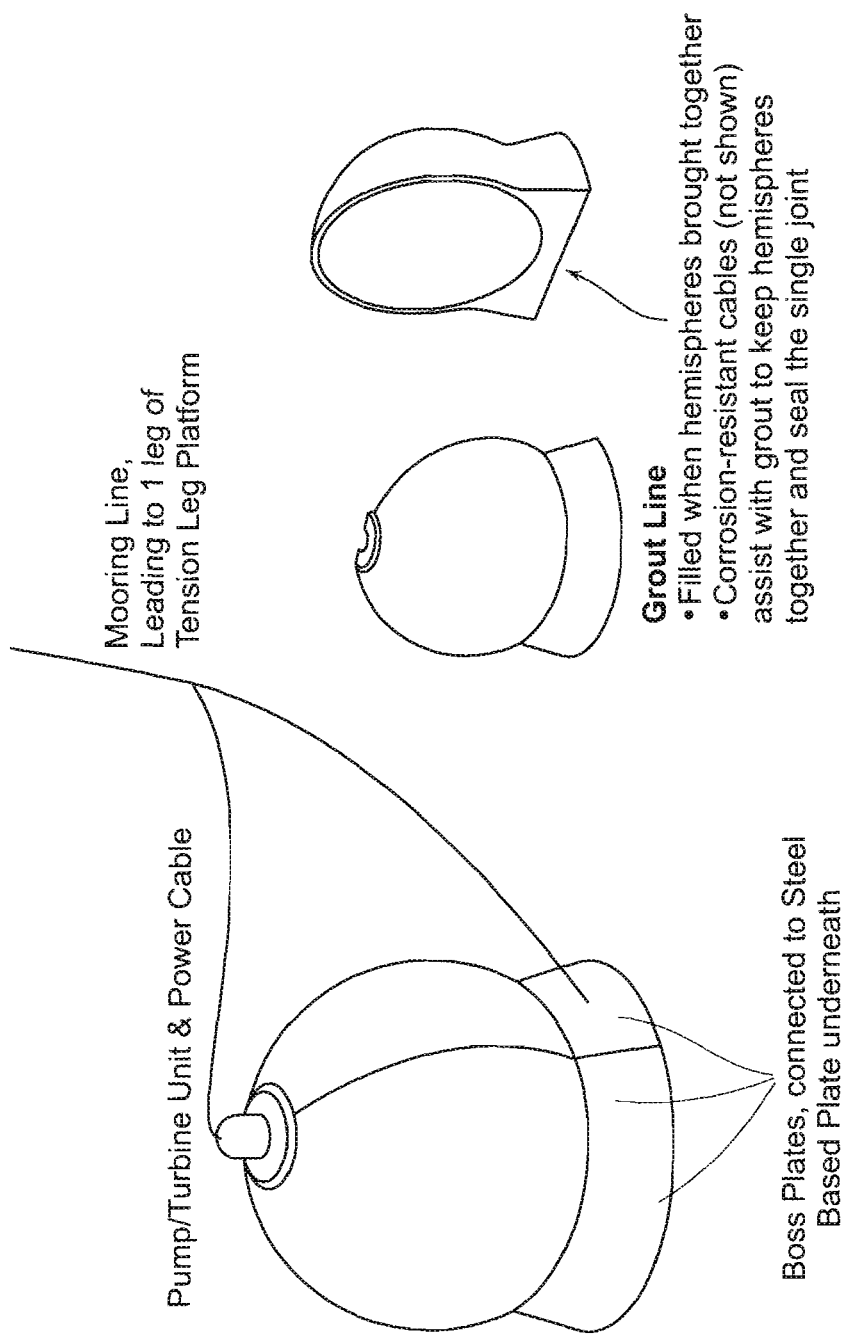
FIG. 8 are views of a hemispherical design according to an embodiment of the invention.
Figure 9:
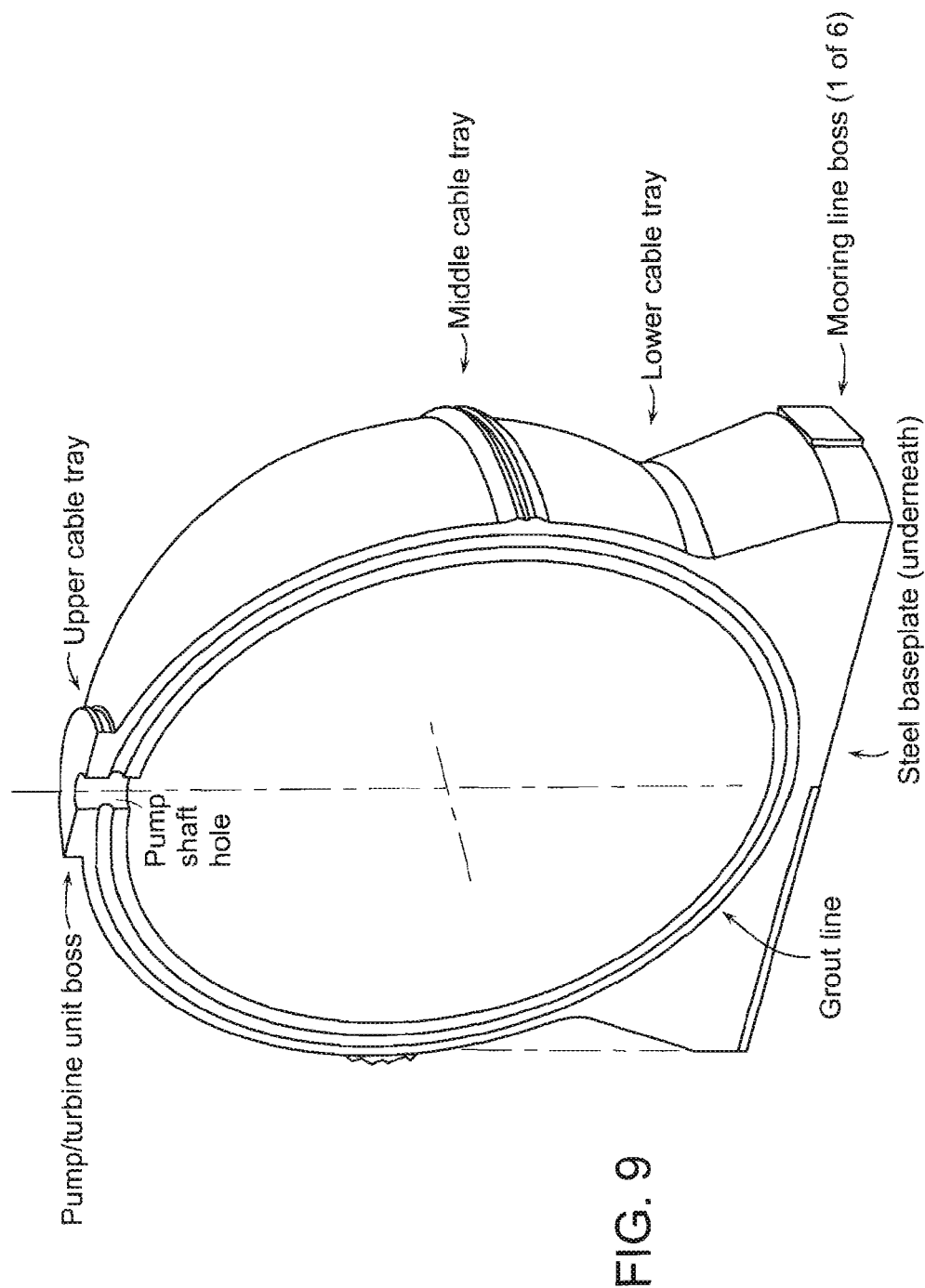
FIGS. 9-16 are perspective views of a particularly preferred embodiment of the invention.
Figure 10:
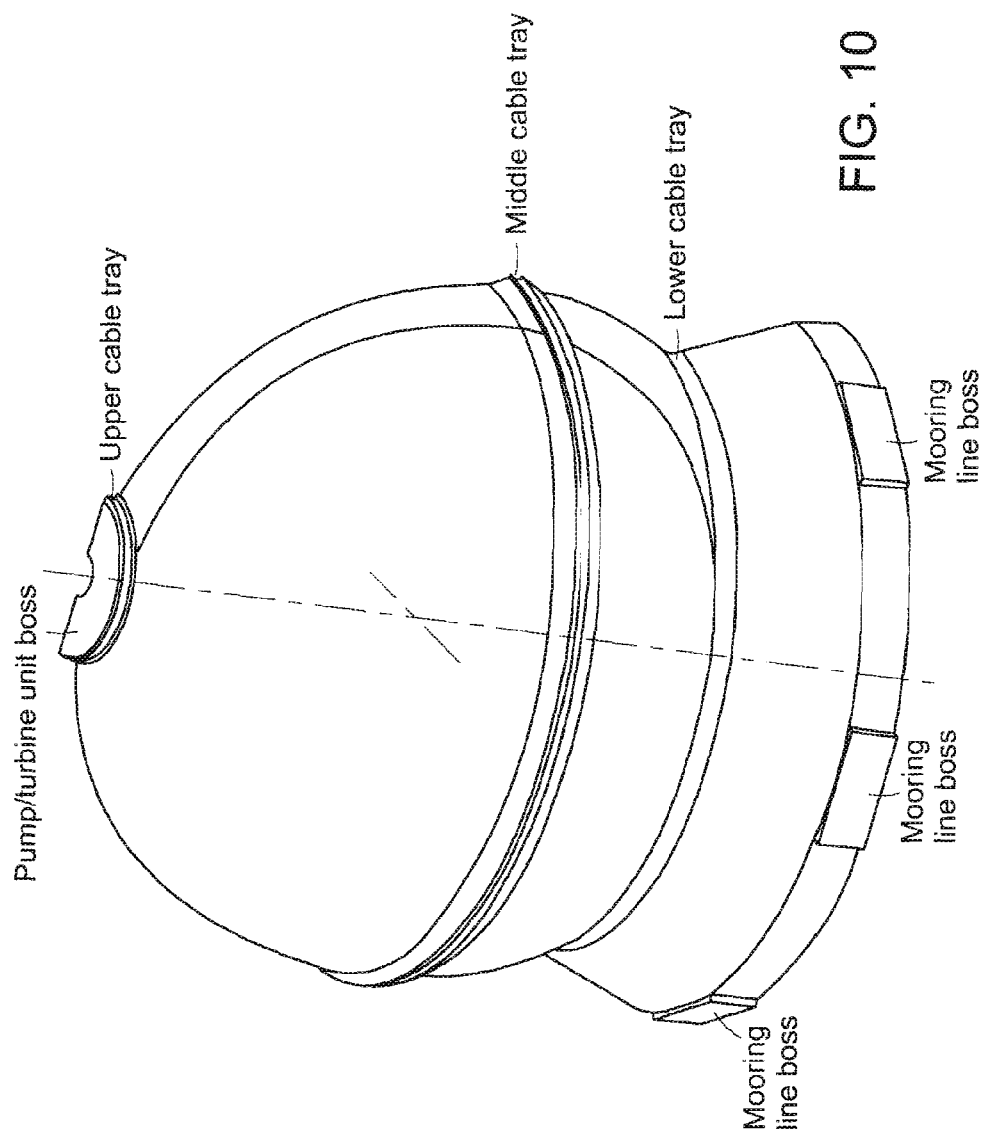
Figure 11:
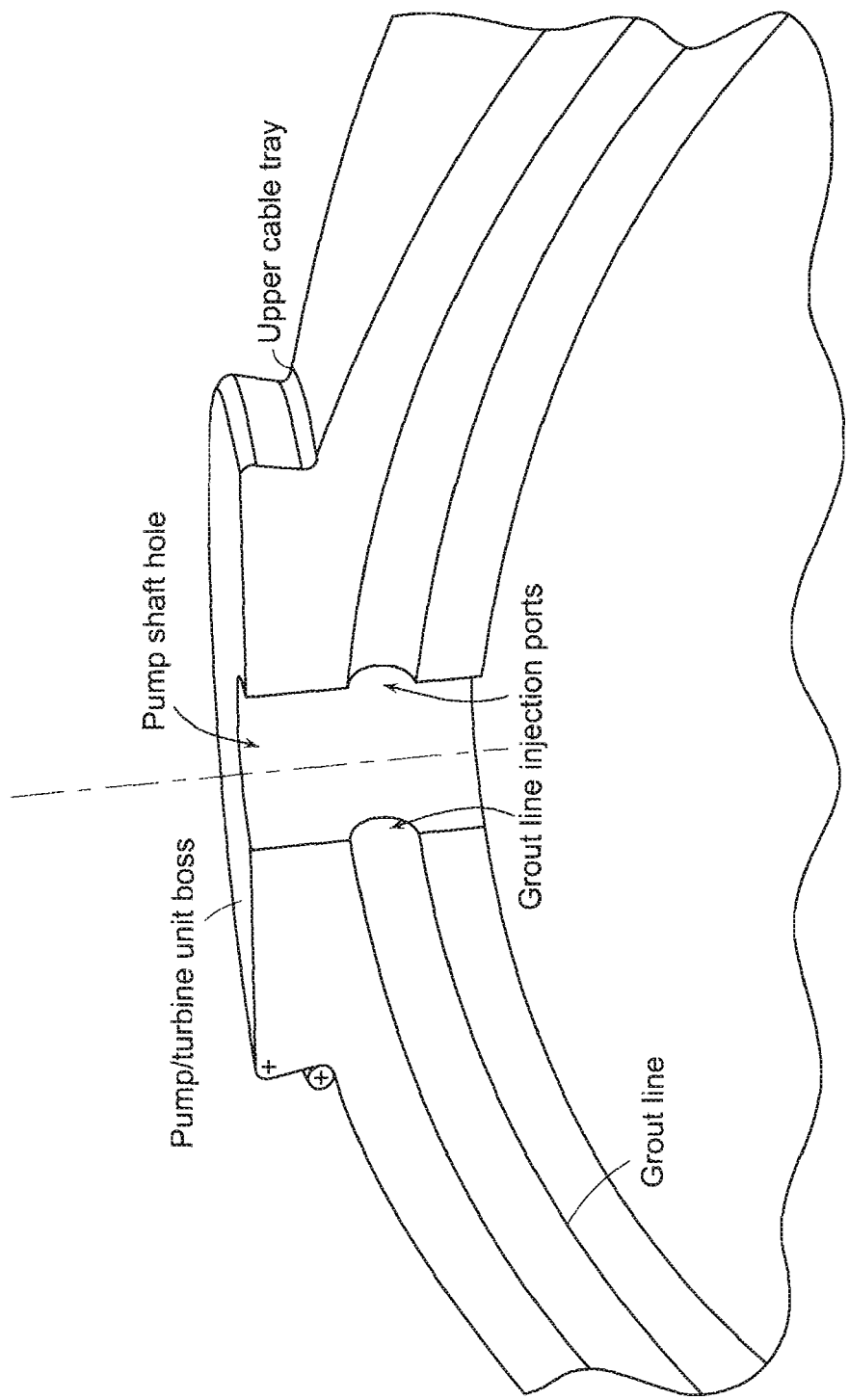
Figure 12:
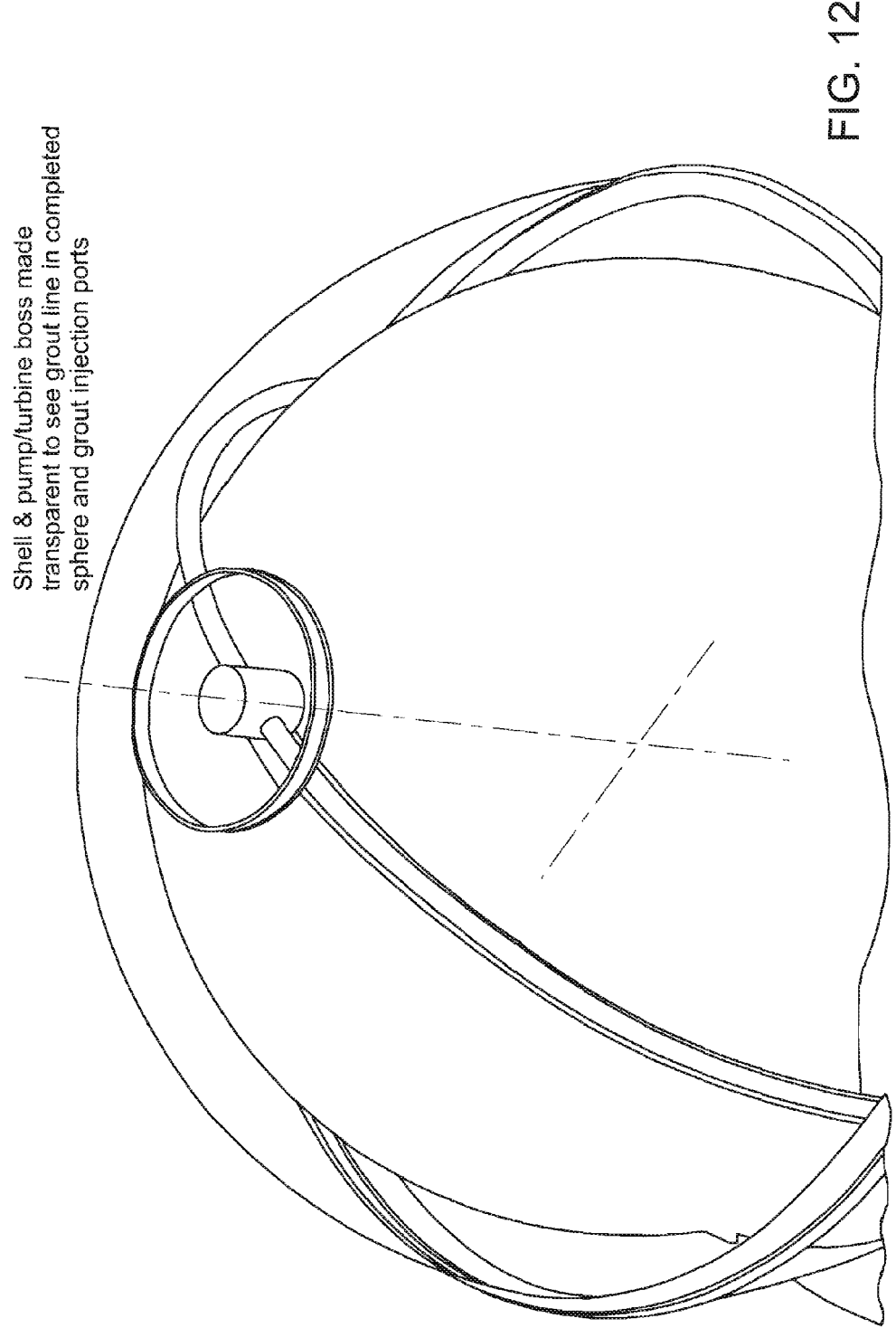
Figure 13:
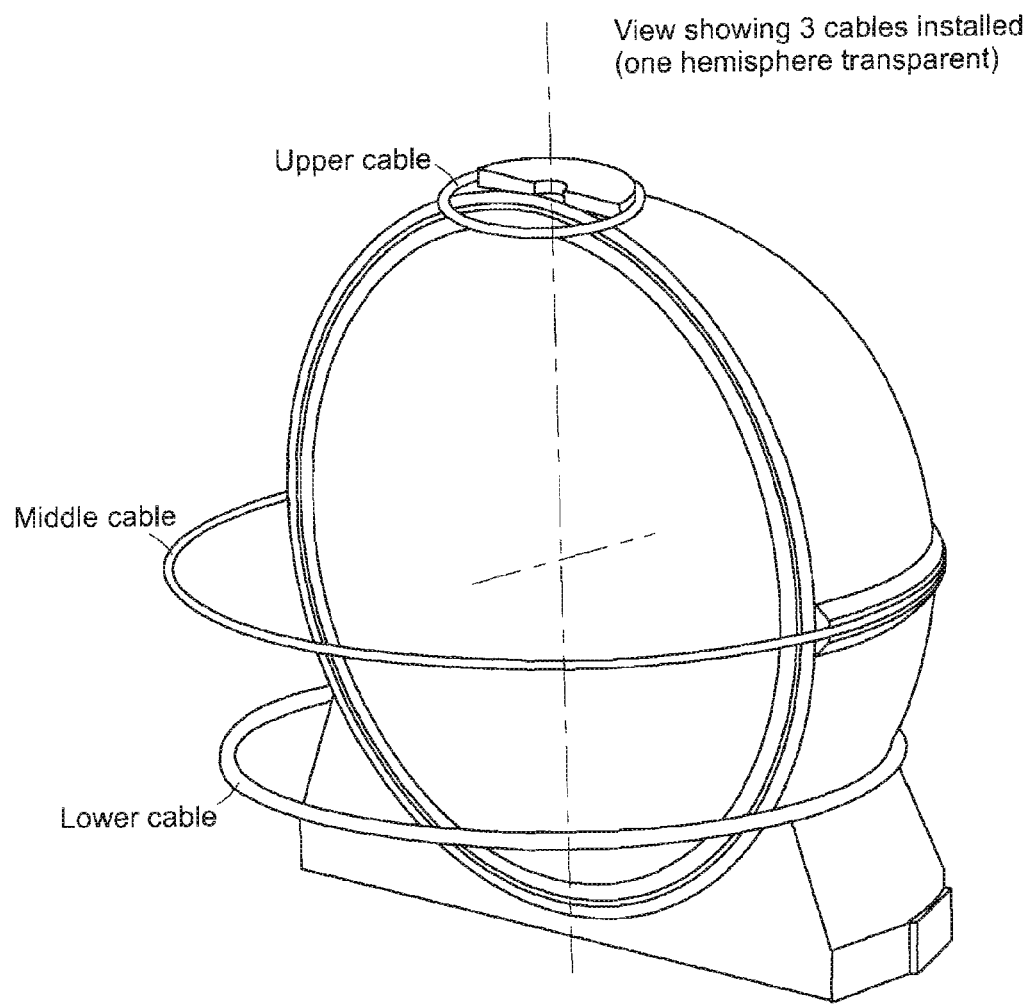
Figure 14:
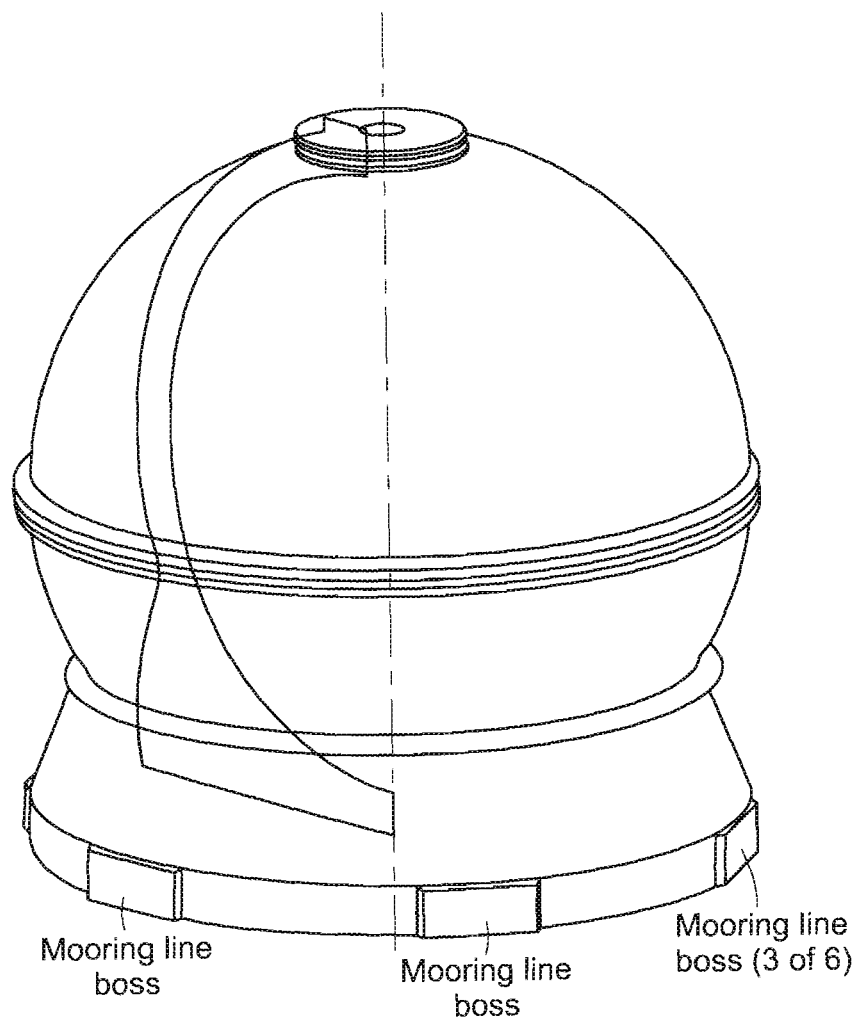
Figure 15:
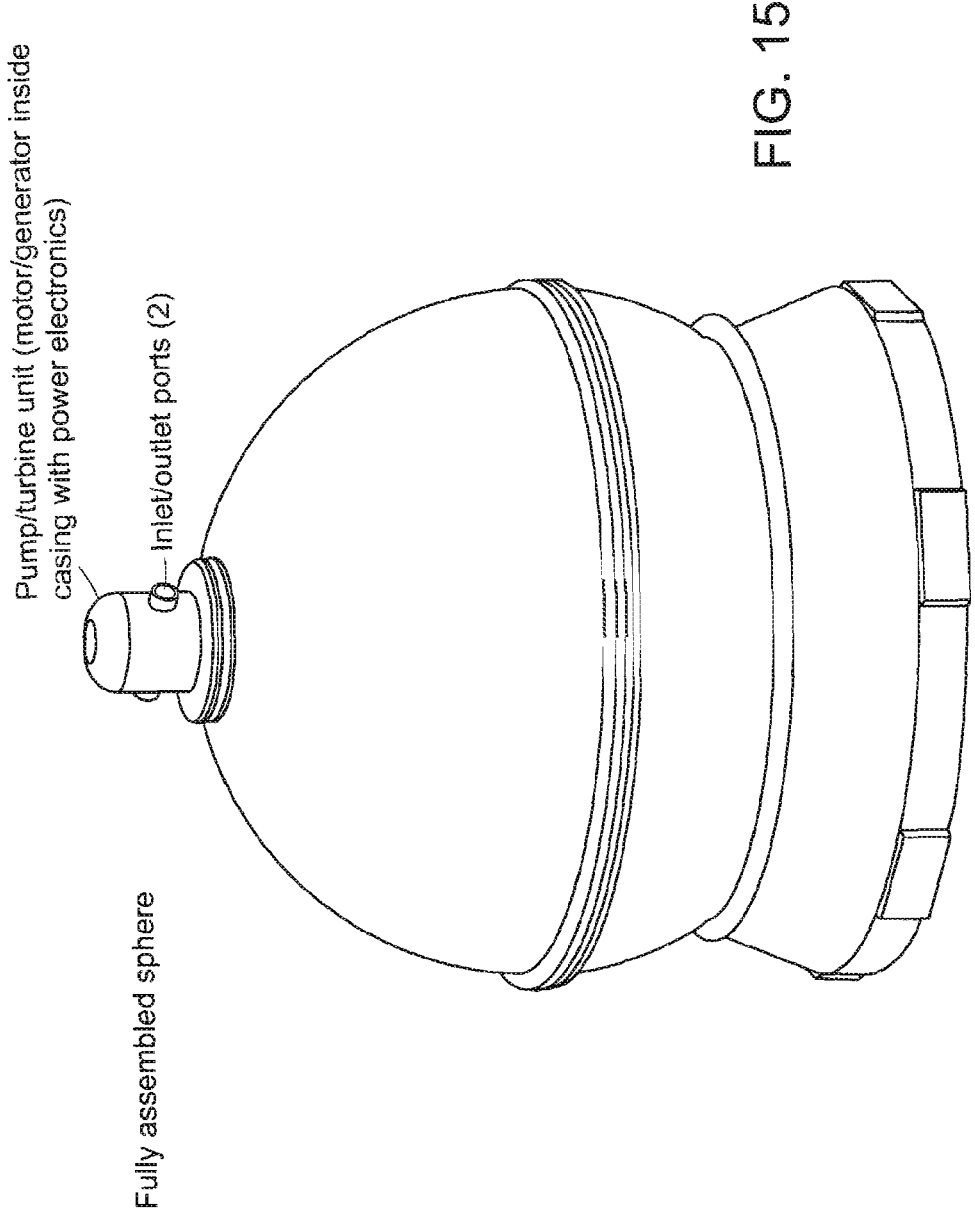
Figure 16:
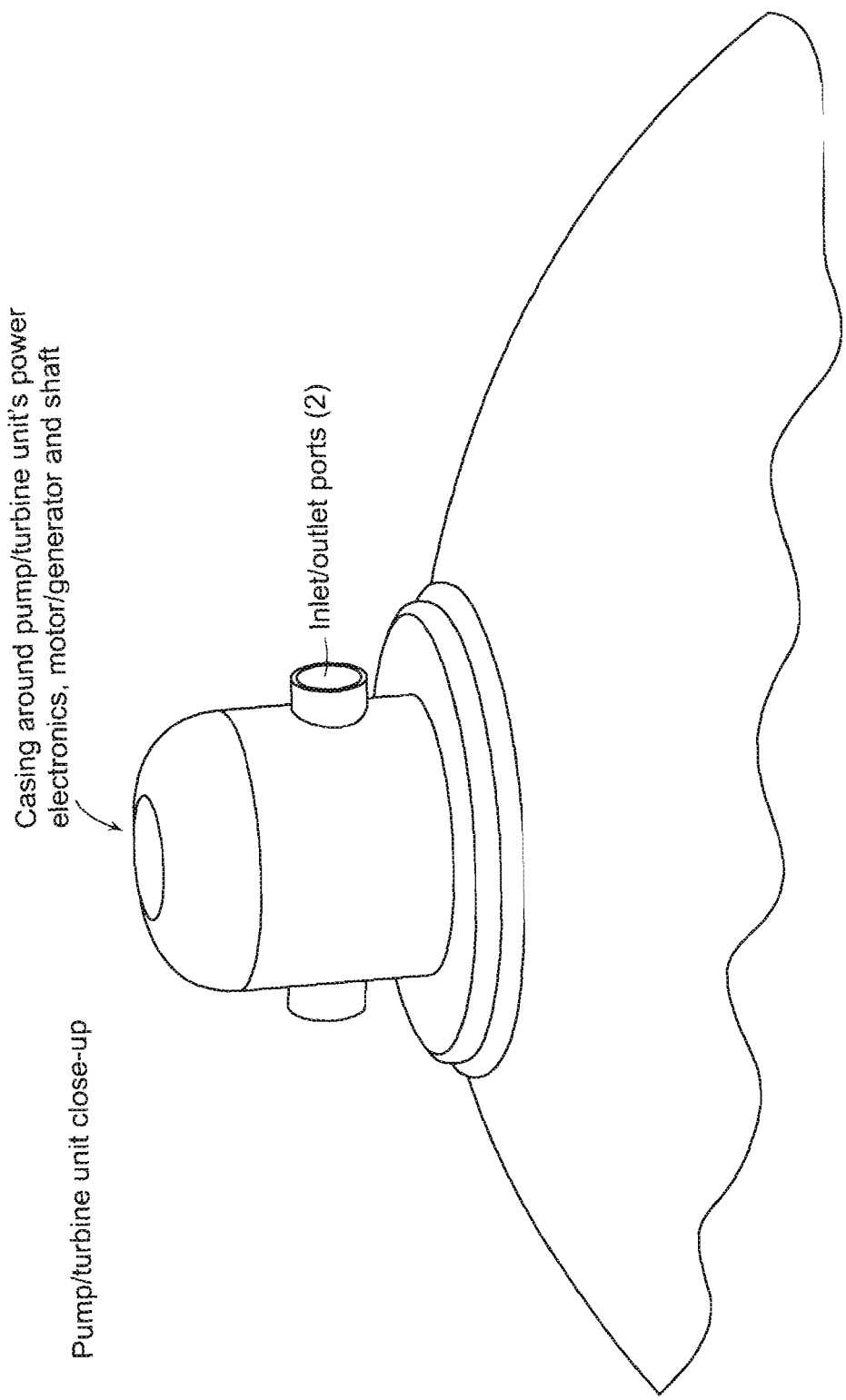

Those of ordinary skill in the art will recognize that the hollow spheres disclosed herein could be used for undersea fossil-fuel storage. See FIG. 7. For example, during a hurricane, the system disclosed herein could be used to store oil pumped from a local well. The notional concept is that a sphere similar in design to the energy-storage sphere 100 in FIG. 6 is lowered to a position near a well head. A diverter manifold is made part of the wellhead or Christmas tree (mounted atop a wellhead) that allows oil to continue flowing to the sphere while securing the riser to the ocean surface during shut-in procedures. When the spheres are full the diverter manifold is automatically secured. When a rig/platform becomes operational and drilling continues after a storm has passed, the diverter manifold would be designed to allow the stored oil to be drawn up to the surface along with the oil from the well. Once the sphere is empty of oil (water flows back into the sphere so it is always filled), the manifold secures and the sphere remains full of water until needed for the next storage operation. An internal rolling bladder maintains the interface between oil and water to eliminate the need for oil/water separation at the oil rig/platform.

The inventors herein converged on a hemispherical design as a preferred embodiment as shown in FIGS. 8-18. A 2-piece mold is to be utilized for precasting and the challenge of draft angles for the inner mold are currently being evaluated with small prototypes. The need for top and bottom caps was eliminated, with only a small hole retained for the pump/turbine unit and access holes at the top to inject grout during assembly. The thick-shell concept was used to provide additional hoop strength, buckling resistance, and sufficient ballast. The simple conical base shown in FIG. 8 allows the spheres to rest on bottoms with up to 10% gradient slope. Alternative base designs may also prove adequate. To facilitate manufacturing, the bottom of each hemisphere is a steel plate that acts as part of the mold during casting; an exact design of the steel plate is ongoing but is envisioned to provide structure for supporting the hemisphere/completed sphere on land, provide attachment points for holding buoyancy modules or transport barges (the spheres are at least 500 mt more than the volume they displace and thus will not float), and provide attachment padeyes for the floating wind turbine mooring lines and power cables.

The design of the bottom of the hemisphere is of vital importance as it acts as the primary anchoring point for the floating wind turbine. The underside of the plate must be able to remain anchored in the soil under dynamic loading conditions while minimizing the transference of any stresses to the concrete. The concrete of the sphere, as far as the moorings are concerned, act only as the weight to imbed the anchor firmly into the soil. The base plate must also be able to hold the entire sphere structure during towing; the current concept is to attach large buoyancy modules to either side of the sphere (the sphere is heavier than its displacement due to the ballast still required by the floating wind turbine when the sphere is in its most buoyant state) or to load the spheres onto a barge with a moon-pool through which the spheres can be lowered down to the sea-bottom in a controlled manner with friction- or powered-winches.

FIGS. 9-16 provide details for constructing the hemispheres and joining them together to form the storage spheres in a particularly preferred embodiment of the invention. FIGS. 17 and 18 illustrate a stress analysis for the embodiments shown in FIGS. 9-16. In particular, FIG. 17 is a stress analysis for a hemisphere under gravity loads, and FIG. 18 is a stress analysis of the sphere under pressure and buoyant forces.

FIG. 19 shows the preferred embodiment of the invention for non-rocky soil types. The structure comprises of two parts: a domed energy storage evacuation chamber, denoted by 1, and the suction pile caissons, denoted by 2. FIG. 20 shows a cutaway of this structure to reveal that the suction caisson is isolated from the storage chamber via a steel slab. In its preferred embodiment, a shaft of the suction caisson is rolled high strength steel that is friction stir welded together. The length of the suction caisson is determined by site-specific soil conditions. Fins 4 extend from the shaft of the caisson to both provide structural reinforcement for the caisson as it is embedded in the soil and to add additional holding capacity. The fins 4 are tapered near the bottom of the caisson to ease soil entry.

FIG. 19 shows that the suction caisson is attached to the mooring line via a pad-eye 3 that is located approximately two-thirds down the length of the caisson. This placement allows for maximum holding capacity, given the hexagonal mooring layout. This placement also ensures that the loading from the wind turbine is isolated from the evacuation chamber.

FIG. 21 shows a close-up of the internal support structure for the evacuation chamber. In its preferred embodiment, the chamber has T-beams spaced at regular intervals along the length of the walls. The dimensions and spacing of these T-beams are specific to the water depth and volume of the evacuation chamber for a given grade of steel. The dome of the structure is a hemispherical cap that, in its preferred embodiment, is friction stir welded at the top of the evacuation chamber.

The design and manufacture of large concrete structures for onshore and offshore and underwater use is well known in the concrete industry and can be readily adapted for use with the embodiments presented herein. Further modifications of the invention will also occur to persons skilled in the art and all such are deemed to fall within the spirit and scope of the invention as defined by the appended claims.

What is claimed is:

1. System for harvesting, storing and generating energy comprising:
   A buoyant structure supporting machinery to harvest energy from wind, waves, or currents;
   At least one energy storage and power generating unit anchored to a sea floor and adapted to tether the buoyant structure to the unit;
   Wherein the unit includes an internal chamber into which water flows through a hydroelectric turbine to generate energy;
   A pump powered by energy from the floating structure machinery to evacuate water from the unit; and
   A control system to direct power from the floating structure machinery to pump water out of the unit when desired and to allow water to flow into the chamber through the hydroelectric turbine to generate energy when desired.

2. The system of claim 1 where the energy generated by the unit is electrical.

3. The system of claim 1 where the energy generated by the unit is hydraulic.

4. The system of claim 1 wherein the machinery includes a wind turbine and/or a water turbine and/or a wave extraction device and/or a surface-side generator.

5. The system of claim 1 wherein the energy storage and power generating unit is made of precast concrete elements and/or high strength steel components.

6. The system of claim 1 wherein the pump is the hydroelectric turbine run in reverse.

7. The system of claim 1 wherein the pump is a positive displacement pump.

8. The system of claim 1 wherein the energy storage and power generating unit is anchored to the seafloor by piles, grouting or suction anchors.

9. The system of claim 1 wherein the energy storage and power generating unit is anchored to the seafloor by virtue of its mass.

10. The system of claim 5 wherein the precast concrete elements are held together by post-tensioned cables.

11. The system of claim 5 wherein the steel is joined with friction stir welds.

12. The system of claim 1 wherein the machinery to extract energy comprises a wind turbine exposed to air and a water turbine supported beneath the water's surface.

13. The system of claim 1 wherein the machinery to extract energy includes a wind turbine to generate hydraulic power.

14. The system of claim 9 wherein the wind turbine is approximately 120 meters above the surface of the water and the water current turbine is placed at a depth to expose it to high average speed water currents.

15. The system of claim 1 wherein the unit is constructed of two thick-shelled hemispheres joined with post-tensioned cables and grout.

16. The system of claim 1 wherein the internal chamber is substantially spherical.

17. The system of claim 1 including a plurality of the floating structures and energy storage and power generating units forming a power network.

* * * * *